United States Patent
Filippov et al.

(10) Patent No.: US 11,589,055 B2
(45) Date of Patent: Feb. 21, 2023

(54) METHOD AND APPARATUS OF MODE- AND SIZE-DEPENDENT BLOCK-LEVEL RESTRICTIONS FOR POSITION DEPENDENT PREDICTION COMBINATION

(71) Applicant: HUAWEI TECHNOLOGIES CO., LTD., Guangdong (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 17 days.

(21) Appl. No.: 17/360,224

(22) Filed: Jun. 28, 2021

(65) Prior Publication Data

US 2021/0344931 A1  Nov. 4, 2021

Related U.S. Application Data

(63) Continuation of application No. PCT/RU2019/050256, filed on Dec. 24, 2019.

(Continued)

(51) Int. Cl.
*H04N 19/00* (2014.01)
*H04N 19/159* (2014.01)
(Continued)

(52) U.S. Cl.
CPC .......... *H04N 19/159* (2014.11); *H04N 19/11* (2014.11); *H04N 19/132* (2014.11); *H04N 19/176* (2014.11); *H04N 19/186* (2014.11)

(58) Field of Classification Search
CPC .... H04N 19/159; H04N 19/11; H04N 19/132; H04N 19/176; H04N 19/186
See application file for complete search history.

(56) References Cited

U.S. PATENT DOCUMENTS

2015/0016501 A1*  1/2015  Guo .................... H04N 19/593
                                                 375/240.02
2018/0262763 A1   9/2018  Seregin et al.

FOREIGN PATENT DOCUMENTS

CA      3048242 A1    7/2018
CA      3065490 A1   11/2018
(Continued)

OTHER PUBLICATIONS

Bross. "Versatile Video Coding (Draft 1)", JVET-J1001-v2, Apr. 2018 from JVET-K0063-ChangesToSpec. (Year: 2018).*
(Continued)

*Primary Examiner* — Zhihan Zhou
(74) *Attorney, Agent, or Firm* — Womble Bond Dickinson (US) LLP

(57) ABSTRACT

An intra prediction method is described. The method can include determining a prediction value for a sample of a current block from one or more reference samples outside the current block by using an intra predication mode. The method can also include deriving a weighted prediction value, when one or more predefined conditions are not satisfied, wherein the one or more predefined conditions relate to at least one of a width and/or a height of the current block and the intra prediction mode. Furthermore, the method can include coding the current block using the weighted prediction value, when the one or more predefined conditions are not satisfied.

16 Claims, 19 Drawing Sheets

Related U.S. Application Data

(60) Provisional application No. 62/787,374, filed on Jan. 1, 2019, provisional application No. 62/786,551, filed on Dec. 31, 2018.

(51) Int. Cl.
  *H04N 19/11* (2014.01)
  *H04N 19/132* (2014.01)
  *H04N 19/176* (2014.01)
  *H04N 19/186* (2014.01)

(56) References Cited

FOREIGN PATENT DOCUMENTS

| | | |
|---|---|---|
| CN | 107113425 A | 8/2017 |
| CN | 109076241 A | 12/2018 |
| RU | 2641252 C2 | 1/2018 |

OTHER PUBLICATIONS

Document: JVET-K0063-v2, Geert Van der Auwera et al, CE3: Simplified PDPC (Test 2.4.1), Joint Video Experts Team (JVET) of ITU-T SG 16 WP 3 and ISO/IEC JTC 1/SC 29/WG 11, 11th Meeting: Ljubljana, SI, Jul. 10-18, 2018, total 6 pages. XP030199601.
Document: JVET-M0122-v1, Alexey Filippov et al, Non-CE3: On block size restrictions for PDPC, Joint Video Experts Team (JVET) of ITU-T SG 16 WP 3 and ISO/IECJTC 1/SC 29/WG11, 13th Meeting: Marrakech, MA, Jan. 9-18, 2019, total 6 pages. XP030213126.
Document: JVET-J0069_r1, Geert Van der Auwera et al, Extension of Simplified PDPC to Diagonal Intra Modes, Joint Video Experts Team (JVET) of ITU-T SG 16 WP 3 and ISO/IEC JTC 1/SC 29/WG11, 10th Meeting: San Diego, USA, Apr. 10-20, 2018, total 5 pages. XP030248257.
Document: JVET-C0040-r3, F. Galpin et al, Adaptive Clipping in JEM2.0, Joint Video Exploration Team (JVET) of ITU-T SG 16 WP 3 and ISO/IEC JTC 1/SC 29/WG 11, 3rd Meeting: Geneva, CH, May 26-Jun. 1, 2016, total 7 pages.
ITU-T H.264(Apr. 2017), Series H: Audiovisual and Multimedia Systems, Infrastructure of audiovisual services-Coding of moving video, Advanced video coding for generic audiovisual services, total 812 pages.
ITU-T H.265(Feb. 2018), Series H: Audiovisual and Multimedia Systems Infrastructure of audiovisual services-Coding of moving video, High efficiency video coding, total 692 pages.

\* cited by examiner

FIG. 9 DC mode PDPC weights for (0, 0) and (1, 0) positions inside one 4x4 block.

Definition of samples used by PDPC extension to diagonal and adjacent angular intra modes.

METHOD AND APPARATUS OF MODE- AND SIZE-DEPENDENT BLOCK-LEVEL RESTRICTIONS FOR POSITION DEPENDENT PREDICTION COMBINATION

CROSS-REFERENCE TO RELATED APPLICATIONS

This application is a continuation of International Application No. PCT/RU2019/050256, filed on Dec. 24, 2019, which claims priority to U.S. Provisional Patent Application No. 62/786,551, filed on Dec. 31, 2018 and U.S. Provisional Patent Application No. 62/787,374, filed on Jan. 1, 2019. All of the aforementioned patent applications are hereby incorporated by reference in their entireties.

TECHNICAL FIELD

The present disclosure generally relates to the field of picture processing and more particularly to intra-prediction with position dependent prediction combination.

BACKGROUND

Video coding (i.e., video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications. The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claim. Further implementation forms are apparent from the dependent claims, the description and the figures.

Herein, it is provided an intra prediction method, comprising the following steps:
  determining a prediction value for a sample of a current block from one or more reference samples outside the current block by using an intra predication mode;
  deriving a weighted prediction value, when one or more predefined conditions are not satisfied, wherein the one or more predefined conditions relate to at least one of a width and/or a height of the current block and the intra prediction mode that is used for the determination of the prediction value for the sample of the current block; and
  coding the current block using the weighted prediction value, when the one or more predefined conditions are not satisfied.

The current block may be comprised in a current frame of a video sequence or a still image. Particularly, the current block may be coded using the prediction value and not using the weighted prediction value, when the one or more predefined conditions are satisfied (and, in fact, no weighted prediction value is derived).

As it will be described in more detail below in current coding techniques the entire intra prediction process includes both applying a particular intra prediction modes from a plurality of provided intra prediction modes (for example, planar, horizontal, vertical, direct current (DC) modes) in order to obtain prediction (e.g., luma, chroma) values for samples/pixels of current blocks and applying some post-filtering (e.g., smoothing) based on weighted predictions values obtained by weightening the prediction values, in particular, in the context of position dependent prediction combination (PDPC). However, the inventors learned from numerous experiments and practical applications that post-filtering, which may represent a relatively expensive processing that might be even more complicated than applying an intra prediction mode, may not be justified in all applications and might even cause additional problems. Thus, if no significant performance benefits can be achieved, increasing hardware and/or software complexity for carrying out the post-filtering process may not to be justified. For example, linear models used in the intra prediction modes may introduce some artificial dependencies between luma and chroma that are even strengthened by PDPC. In view of this, it is essential for the present disclosure that the process of weightening the prediction values obtained by the application of a selected intra prediction mode is not performed in all cases but rather on a conditional basis. Thereby, the processor load and complexity and duration of the overall coding process might be reduced as compared to the art where appropriate.

According to an embodiment the weighted prediction value is derived based on:
  the prediction value at the position (x, y) of the sample in the current block, where x is a horizontal coordinate of the sample and y is a vertical coordinate of the sample,
  the width and/or the height of the current block,
  a value of a top reference sample of the current block located adjacent to the current block in a row atop of the current block at the x-th column of the current block and a value of a left reference sample of the current block located adjacent to the current block in a column on the left-hand side of the current block at the y-th row of the current block, and
  the intra prediction mode used for the determination of the prediction value for the sample of the current block.

In this embodiment, the intra prediction based on an intra prediction mode is combined with position-dependent weightening based on some top and left reference samples in the context of PDPC. Application of a PDPC post-filtering, where appropriate, may result in a reliable improvement of the prediction accuracy as compared to a mere application of a selected intra prediction mode.

Particularly, the weighted prediction value may be derived according to the following formula:

$$\hat{P}(x,y) = \text{Clip1Cmp}((wL \times R_{-1,y} + wT \times R_{x,-1} - wTL \times R_{-1,-1} + (64 - wL - wT + wTL) \times P(x,y) + 32)) >> 6) \text{ wherein}$$

$\hat{P}(x, y)$ is the weighted prediction value of the sample;

P(x, y) is the prediction value of the sample;

$R_{x,-1}$, $R_{-1,y}$ represent the values of the top and the left reference samples of the current block;

$R_{-1,-1}$ represents the value of a reference sample of the current block located adjacent to the current block at the top-left corner of the current block;

wL, wT and wTL represent weights;

wherein the function Clip1Cmp is set equal to a clipping function Clip1Y, when the current block is a luma block, and is set equal to a clipping function Clip1C, when the current block is a chroma block, wherein $$Clip1Y(x) = Clip3(0, (1 << BitDepth_Y) - 1, x)$$

$$Clip1C(x) = Clip3(0, (1 << BitDepth_C) - 1, x)$$

$$Clip3(x, y, z) = \begin{cases} x; & z < x \\ y; & z > y \\ z; & \text{otherwise} \end{cases}$$

and where $BitDepth_Y$ is the bit depth of luma samples and $BitDepth_C$ is the bit depth of chroma samples.

The above-mentioned weights may be derived by $$wL = V >> ((x << 1) >> nScaleX);$$

$$wT = V >> ((y << 1) >> nScaleY);$$

where V, nScaleX, nScaleY are predetermined values (V is 16 or 32, for example; NScaleX may be different from NScaleY, i.e., non-square prediction blocks are involved; see also detailed description below); and wTL=−(wL>>4)−(wT>>4), when the intra prediction mode is a DC mode, wTL=0, when the intra prediction mode is a planar mode, wTL=wT, when the intra prediction mode is a horizontal mode, and wTL=wL, when the intra prediction mode is a vertical mode.

For example, NScaleX=NScaleY=($\log_2$ (w)+$\log_2$ (h)+2)>>2, where w and h are the width and height in units of samples, respectively, of the current (e.g., square) block.

The above-cited concrete ways of calculating the weighted prediction values in the context of PDPC may result in a high prediction accuracy.

Extensive studies carried out by the inventors allowed for identifying particular classes of conditions under which it may not be advantageous to apply post-filtering based on weighted prediction values, in particular, in the context of PDPC. Accordingly, the one or more predefined conditions may consist of at least one of the following conditions:

the sum of the width and the height of the current block is smaller than a first threshold and/or the sum of the width and the height of the current block is larger than a second threshold;

the sum of the width and the height of the current block is smaller than a first threshold or the sum of the width and the height of the current block is larger than a second threshold; and the intra prediction mode is a planar mode or one of the skew non-diagonal modes satisfying ((predMode>=VDIA_IDX−numModes && predMode !=VDIA_IDX)||(predMode !=2 && predMode<=(2+numModes))), wherein VDIA_DX is an index of the diagonal modes, numModes is a predefined integer and predMode is an index of the intra prediction mode;

the sum of the width and the height of the current block is smaller than a first threshold; the sum of the width and the height of the current block is larger than a second threshold; and the intra prediction mode is a planar mode or one of the skew non-diagonal modes satisfying: ((predMode>=VDIA_IDX−numModes && predMode !=VDIA_IDX)||(predMode !=2 && predMode<=(2+numModes)));

the sum of the width and the height of the current block is smaller than a first threshold; the sum of the width and the height of the current block is larger than a second threshold; and the intra prediction mode is a planar mode; and the sum of the width and the height of the current block is smaller than a first threshold; the sum of the width and the height of the current block is larger than a second threshold; and the intra prediction mode is one of the skew non-diagonal modes satisfying ((predMode>=VDIA_IDX−numModes && predMode !=VDIA_IDX)||(predMode !=2 && predMode<=(2+numModes))).

If the current block is a chroma block, the one or more predefined conditions may consist of at least one of the following conditions:

a) the sum of the width and the height of the current block is smaller than a first threshold or the sum of the width and the height of the current block is larger than a second threshold;

b) the sum of the width and the height of the current block is smaller than a first threshold; and the intra prediction mode is a cross-component linear modeling mode;

c) the sum of the width and the height of the current block is smaller than a first threshold and the intra prediction mode is a cross-component linear modeling mode and; the sum of the width and the height of the current block is larger than a second threshold;

d) the sum of the width and the height of the current block is smaller than a first threshold; and the intra prediction mode is a planar mode;

e) the sum of the width and the height of the current block is smaller than a first threshold; and the intra prediction mode is one of the skew non-diagonal modes satisfying ((predMode>=VDIA_IDX−numModes && predMode !=VDIA_IDX)||(predMode !=2 && predMode<=(2+numModes)));

f) the sum of the width and the height of the current block is smaller than a first threshold; and the intra prediction mode is a cross-component linear modeling mode or a planar mode;

g) the sum of the width and the height of the current block is smaller than a first threshold; and the intra prediction mode is a cross-component linear modeling mode or one of the skew non-diagonal modes satisfying: ((predMode>=VDIA_IDX−numModes && predMode !=VDIA_IDX)||(predMode !=2 && predMode<=(2+numModes)));

h) the sum of the width and the height of the current block is smaller than a first threshold or the sum of the width and the height of the current block is larger than a second threshold; and the intra prediction mode is a cross-component linear modeling mode, a planar mode or one of the skew non-diagonal modes: ((predMode>=VDIA_IDX−numModes && predMode !=VDIA_IDX)||(predMode !=2 && predMode<=(2+numModes))); and i) the sum of the width and the height of the current block is smaller than a first threshold; the intra prediction mode is a cross-component linear modeling mode, a planar mode or one of the skew non-diagonal modes satisfying ((predMode>=VDIA_IDX−numModes && predMode !=VDIA_IDX)||(predMode !=2 && predMode<=(2+numModes))); the sum of the width and the height of the current block is larger than a second threshold; and the intra prediction mode is a planar mode or one of the skew non-diagonal modes satisfying: ((predMode>=VDIA_IDX−numModes && predMode !=VDIA_IDX)||(predMode !=2 && predMode<=(2+numModes))).

According to particular embodiments, the above-mentioned parameter numModes is 8 and/or the above-mentioned first threshold is 8 and/or the above-mentioned second threshold is 64.

Furthermore, it is provided herein an encoder comprising processing circuitry configured for carrying out the method according to any of the above-described embodiments. Similarly, it is provided a decoder comprising processing circuitry configured for carrying out the method according to any of the above-described embodiments.

The method according to any of the above-described embodiments can be implemented in a computer program product comprising a program code for performing the method.

Furthermore, it is provided herein a decoder, comprising one or more processors and a non-transitory computer-readable storage medium coupled to the processors and storing programming for execution by the processors, wherein the programming, when executed by the processors, configures the decoder to carry out the method according to any of the above-described embodiments. Similarly, it is provided an encoder comprising one or more processors and a non-transitory computer-readable storage medium coupled to the processors and storing programming for execution by the processors, wherein the programming, when executed by the processors, configures the encoder to carry out the method according to any of the above-described embodiments.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1A:
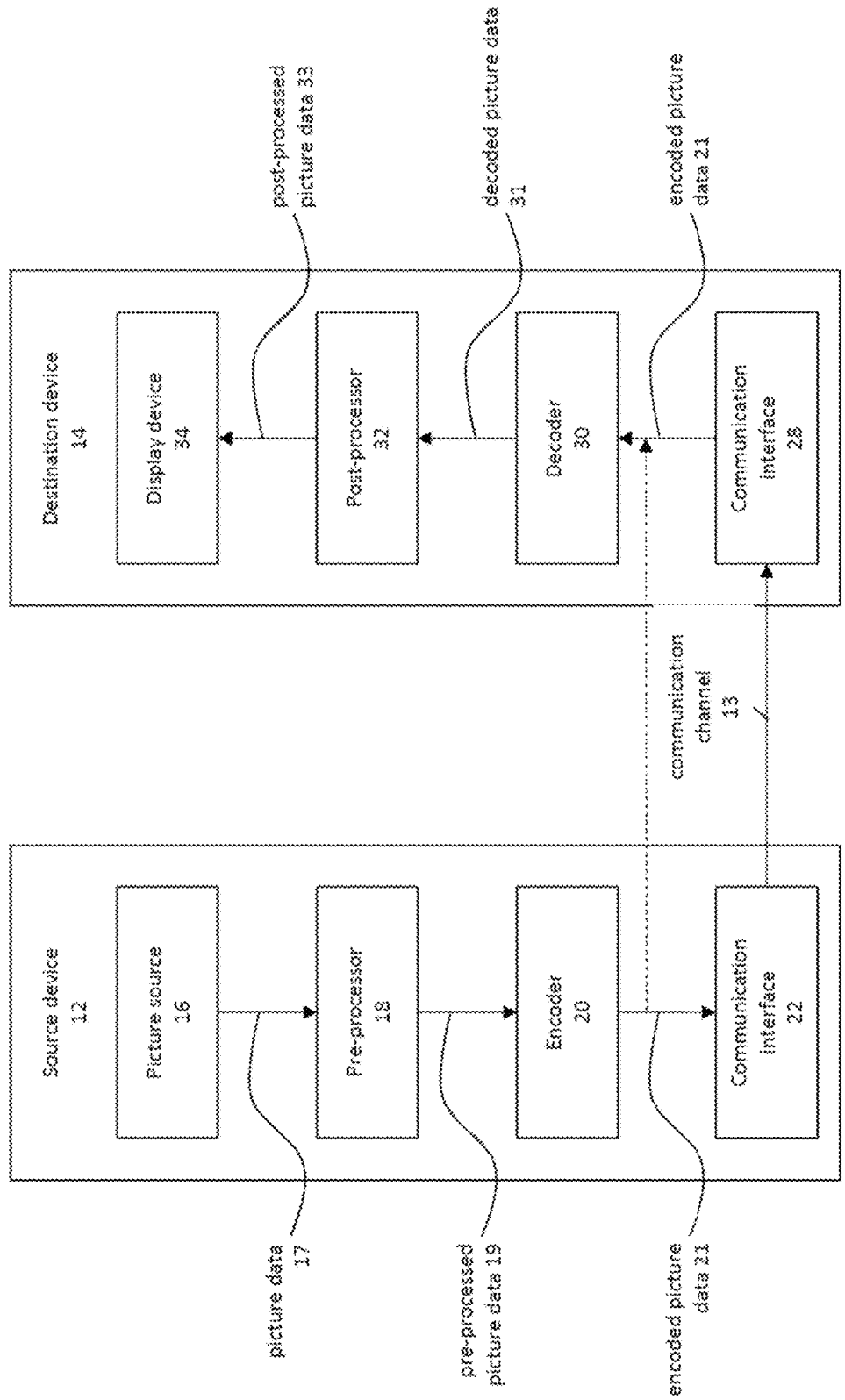
FIG. 1A schematically illustrates an example of a video coding system configured to implement embodiments of the invention.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Logical operators used herein are defined as follows:

x && y Boolean logical "and" of x and y x||yBoolean logical "or" of x and y

! Boolean logical "not"

x ? y:z If x is TRUE or not equal to 0, evaluates to the value of y; otherwise, evaluates to the value of z.

The following relational operators are defined as follows:

> Greater than

>= Greater than or equal to

< Less than

<= Less than or equal to

== Equal to

!= Not equal to

When a relational operator is applied to a syntax element or variable that has been assigned the value "na" (i.e., not applicable), the value "na" is treated as a distinct value for the syntax element or variable. The value "na" is considered not to be equal to any other value.

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (i.e., video block) level, e.g., by using spatial (i.e., intra picture) prediction and/or temporal (i.e., inter picture) prediction to generate a prediction block, subtracting the prediction block from the current block (e.g., block currently processed/to be processed) to obtain a residual block, transforming the residual block and quantizing the residual block in the transform domain to reduce the amount of data to be transmitted (e.g., compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (also referred to herein as coding system 10) that may utilize techniques of this present application. Video encoder 20 (also referred to herein as encoder 20) and video decoder 30 (also referred to herein as decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g., to a destination device 14 for decoding the encoded picture data 13.

The source device 12 comprises an encoder 20, and may additionally, i.e. optionally, comprise a picture source 16, a pre-processor (or pre-processing unit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e. optionally, comprise a communication interface or communication unit 28, a post-processor 32 (or post-processing unit 32) and a display device 34.

The communication interface 28 of the destination device 14 is configured to receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro light emitting diode (LED) displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and split of functionalities of the different units or functionalities within the source device 12 and/or destination device 14 as shown in FIG. 1A may vary depending on the actual device and application.

Figure 1B:
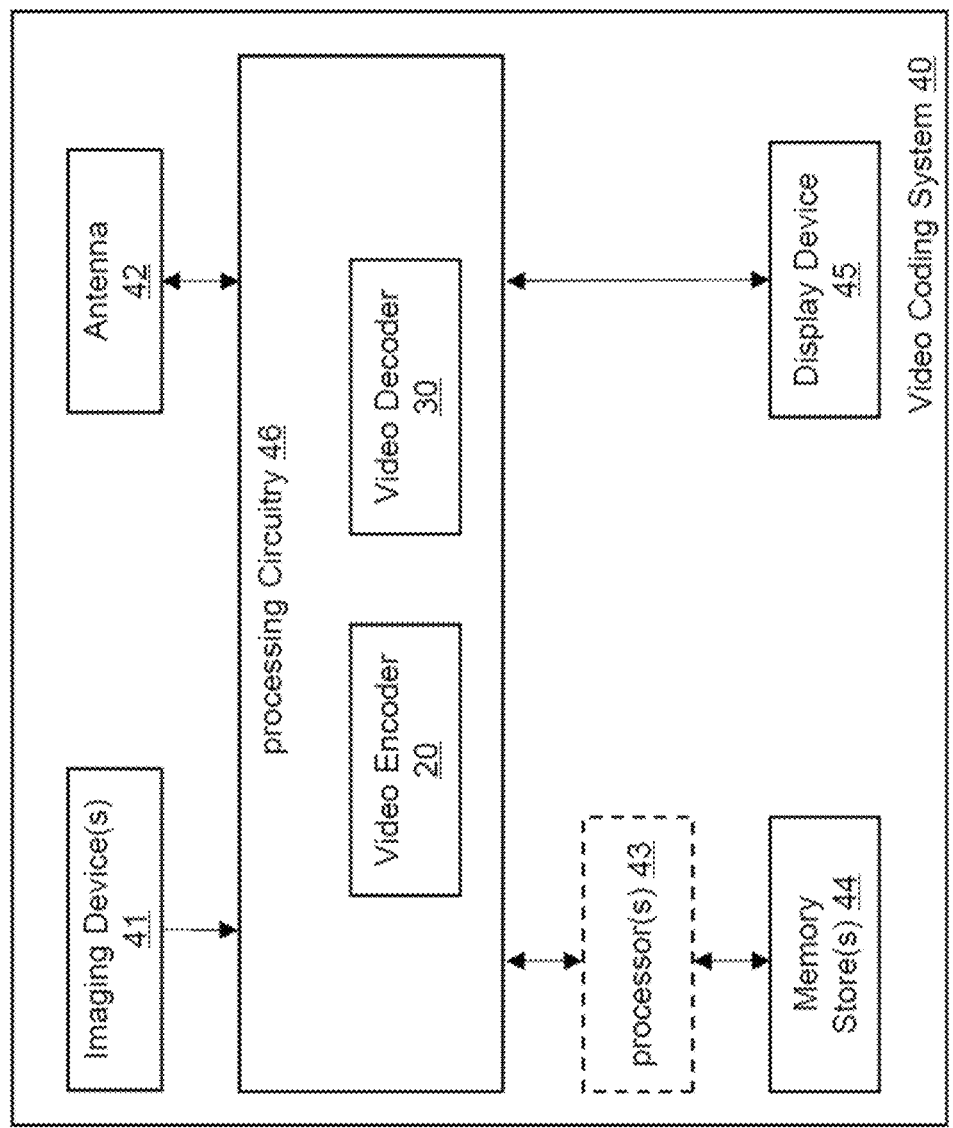
FIG. 1B schematically illustrates another example of a video coding system configured to implement embodiments of the invention.

The encoder 20 (e.g., a video encoder 20) or the decoder 30 (e.g., a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
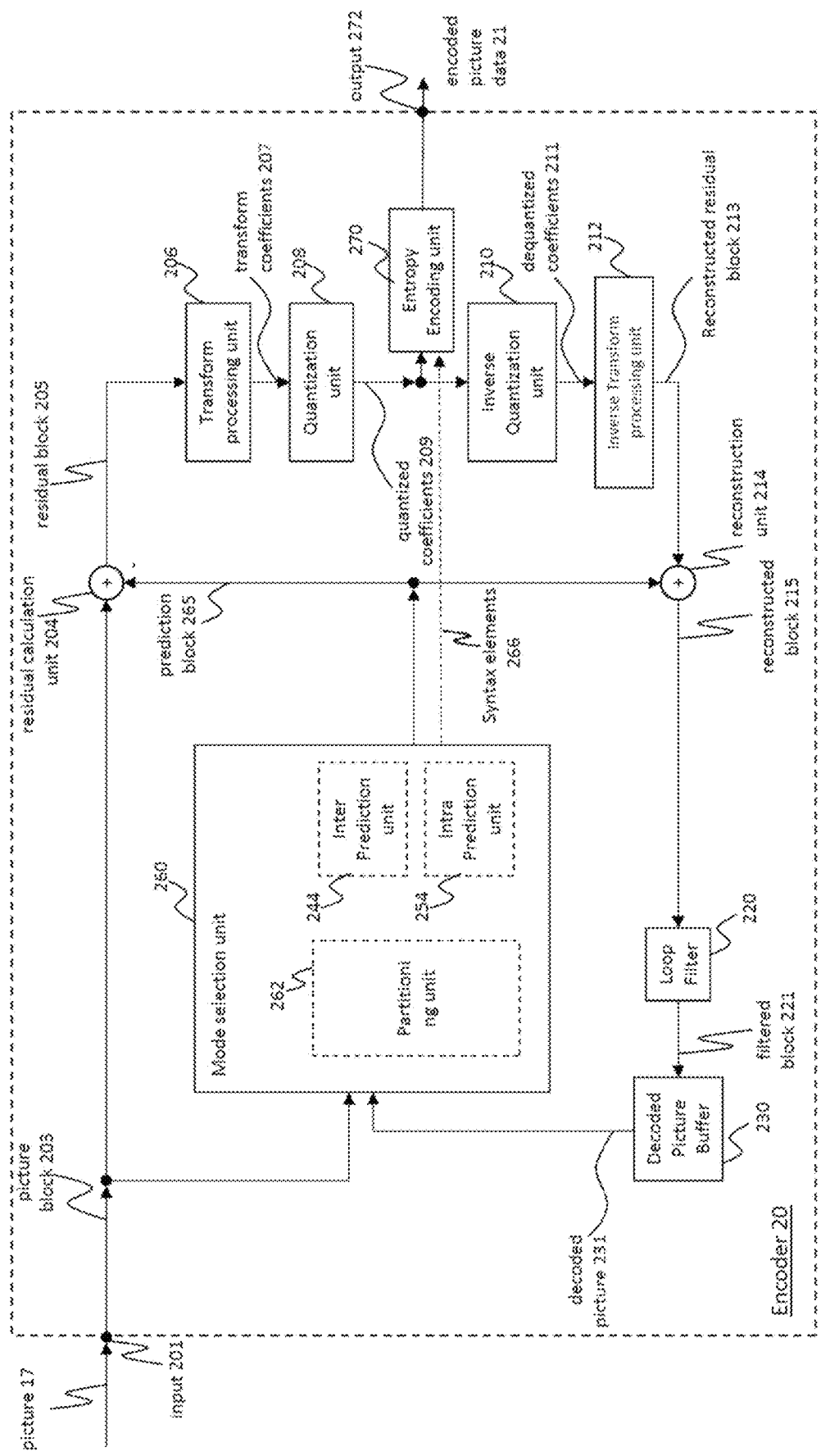
FIG. 2 schematically illustrates an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
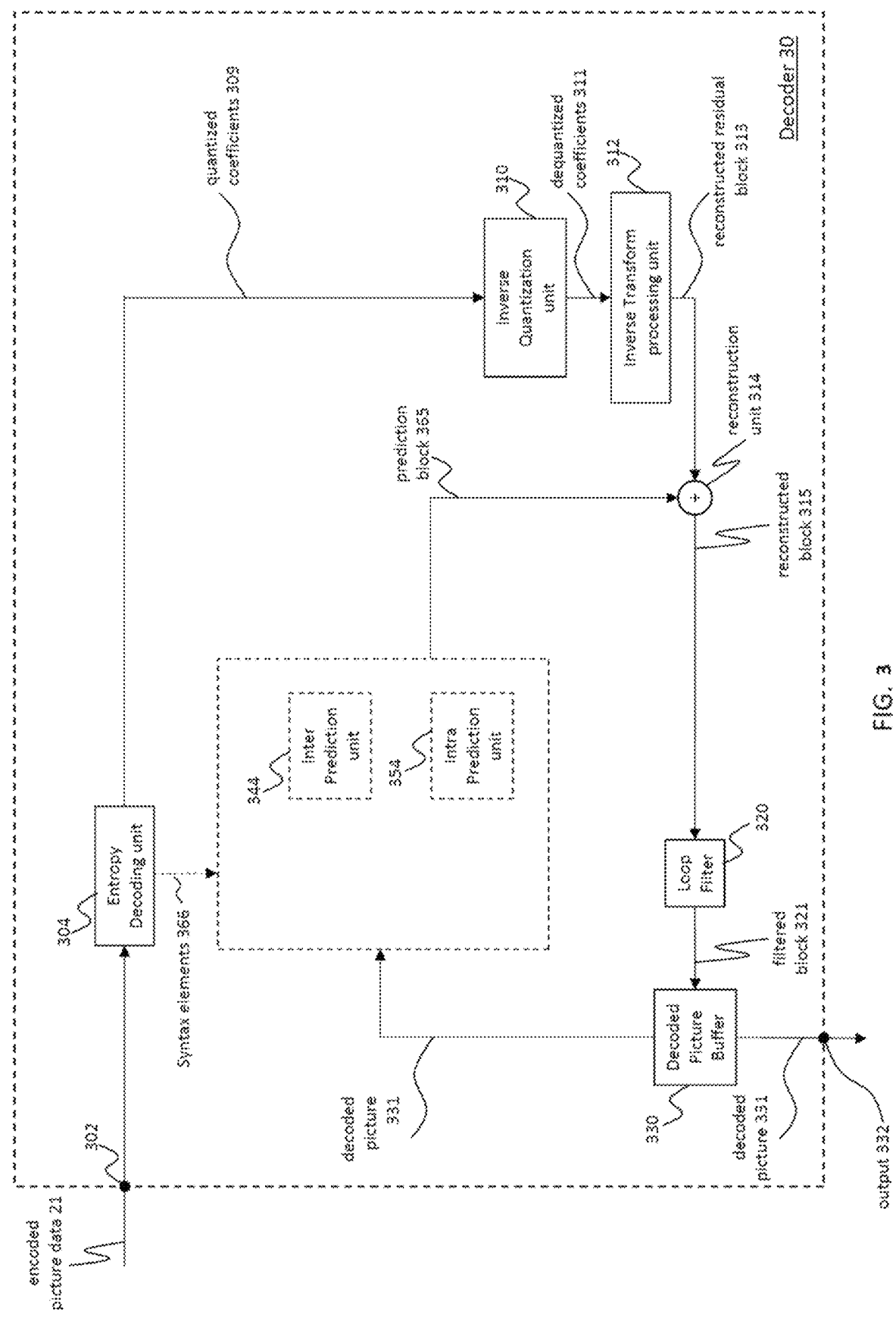
FIG. 3 schematically illustrates an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g., the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QP), e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g., adder or summer 214) is configured to add the transform block 213 (i.e. reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filter, a collaborative filter, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (i.e., current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.
Intra-Prediction The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The VTM (Versatile Test Model) version 3.0 uses 93 intra prediction modes, and several intra smoothing tools, including four-tap subpixel intra interpolation filtering and position-dependent prediction combination (PDPC). PDPC is proposed as a unified mechanism of modification (weightening) of predicted samples that are a results of intra prediction using DC, PLANAR or angular intra prediction modes.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.
Inter-Prediction The set of (or possible) inter-prediction modes depends on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (e.g., a spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bit stream 21, so that, e.g., the video decoder 30 may receive and use the parameters for decoding. The encoded bit stream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g., encoded bit stream 21), e.g., encoded by encoder 20, to obtain a decoded picture 331. The encoded picture data or bit stream comprises information for decoding the encoded picture data, e.g., data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bit stream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filter, a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel. Discussed in greater detail below are embodiments of two methods for constraining the motion vector according to the bitDepth.

Method 1: remove the overflow MSB (most significant bit) by flowing operations:

$$ux = (mvx + 2^{bitDepth}) \% 2^{bitDepth} \qquad (1)$$

$$mvx = (ux >= 2^{bitDepth-1}) ? (ux - 2^{bitDepth}) : ux \qquad (2)$$

$$uy = (mvy + 2^{bitDepth}) \% 2^{bitDepth} \qquad (3)$$

$$mvy = (uy >= 2^{bitDepth-1}) ? (uy - 2^{bitDepth}) : uy \qquad (4)$$

where mvx is a horizontal component of a motion vector of an image block or a sub-block, mvy is a vertical component of a motion vector of an image block or a sub-block, and ux and uy indicates an intermediate value.

For example, if the value of mvx is −32769, after applying formula (1) and (2), the resulting value is 32767. In computer systems, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \qquad (5)$$

$$mvx = (ux >= 2^{bitDepth-1}) ? (ux - 2^{bitDepth}) : ux \qquad (6)$$

$$uy = (mvyp + mvdy + 2^{bitDepth}) \% 2^{bitDepth} \qquad (7)$$

$$mvy = (uy >= 2^{bitDepth-1}) ? (uy - 2^{bitDepth}) : uy \qquad (4)$$

The operations may be applied during the sum of mvp and mvd, as shown in formula (5) to (8).

Method 2: remove the overflow MSB by clipping the value:

$$vx = Clip3(-2^{bitDepth-1}, 2^{bitDepth-1}-1, vx)$$

$$vy = Clip3(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z correspond to three input values of the MV clipping process, and the definition of function Clip3 is as follow:

$$Clip3(x, y, z) = \begin{cases} x; & z < x \\ y; & z > y \\ z; & \text{otherwise} \end{cases}$$

Figure 4:
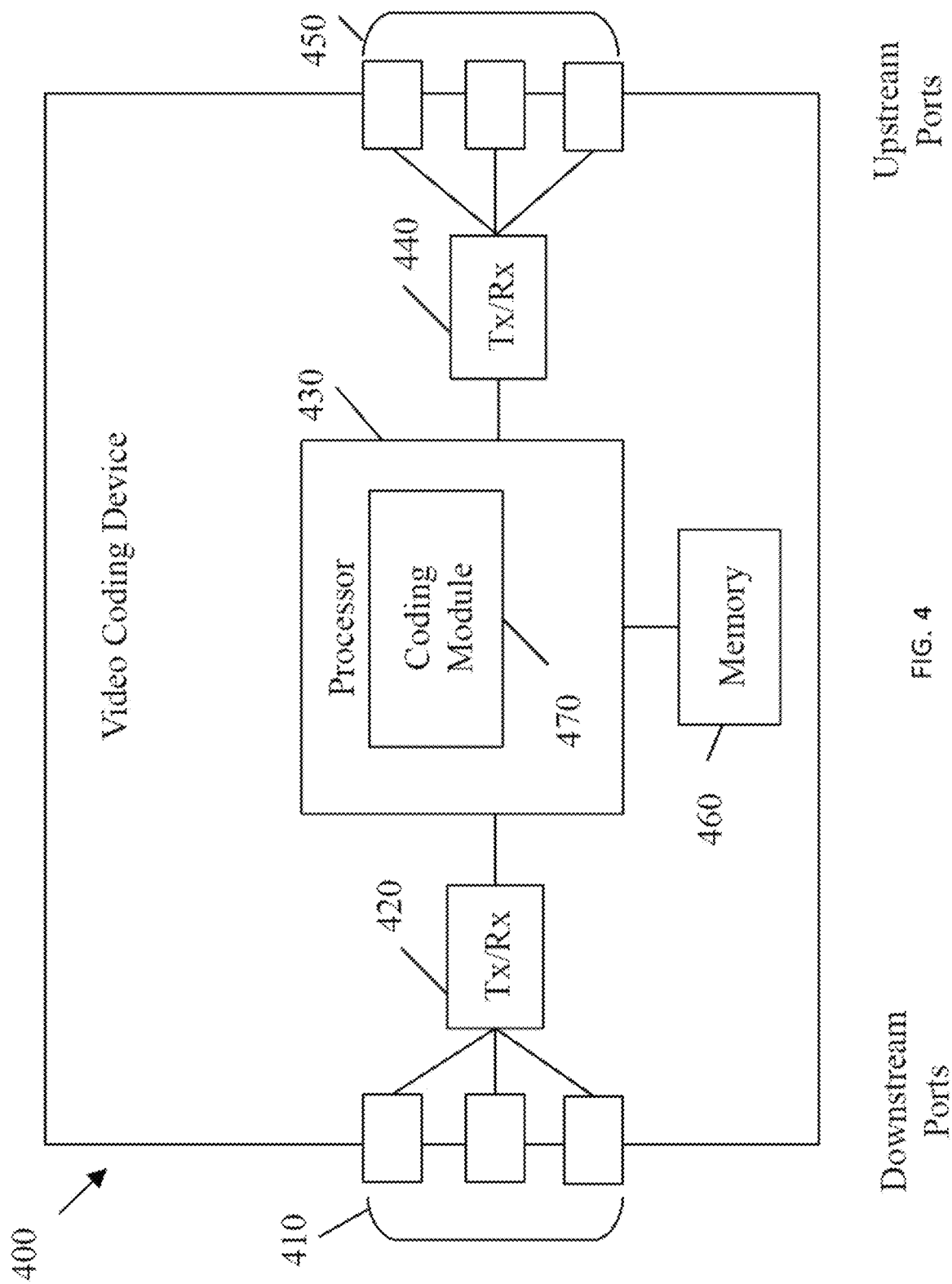
FIG. 4 schematically illustrates an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
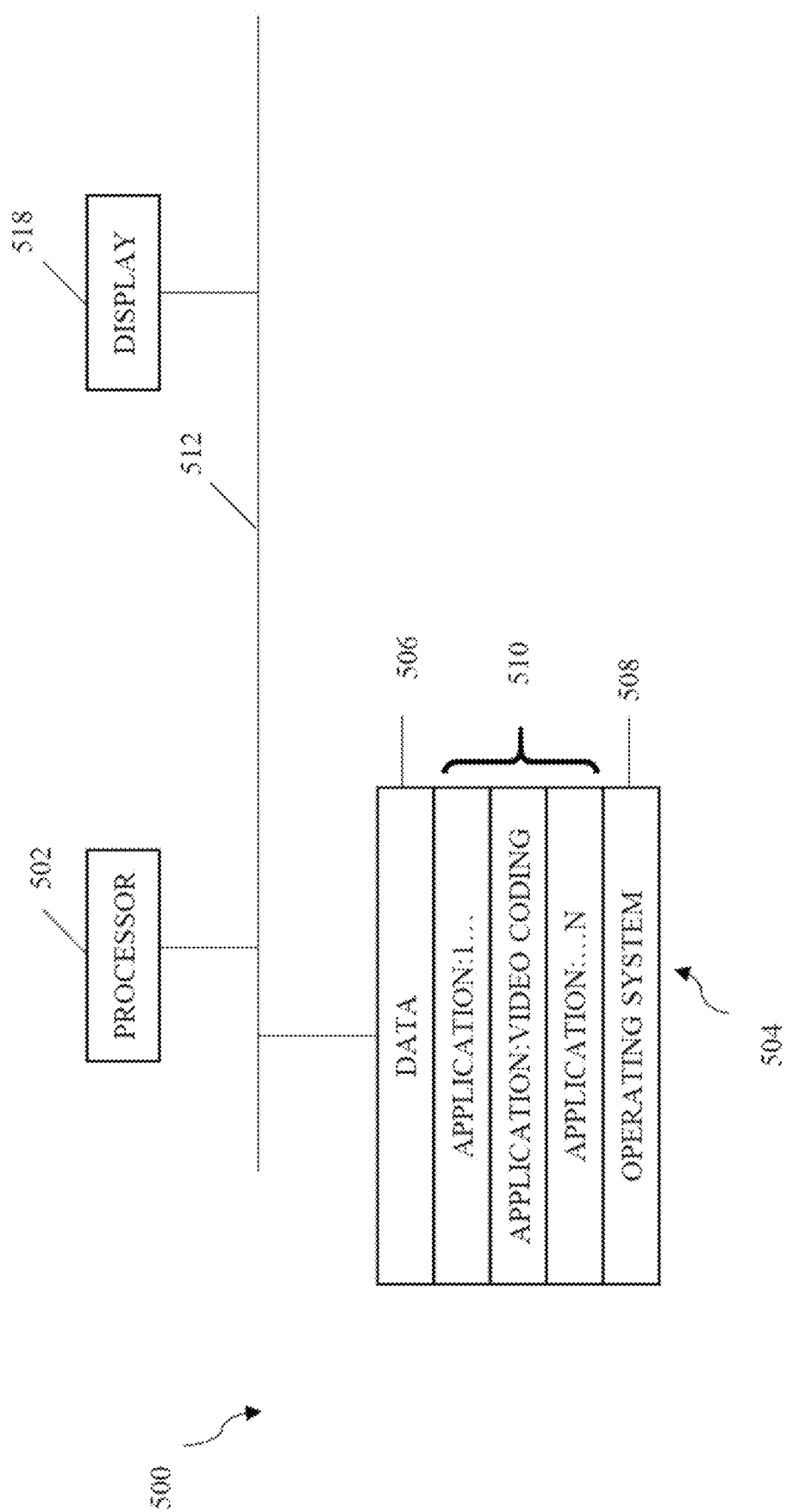
FIG. 5 schematically illustrates another example of an encoding apparatus or a decoding apparatus.
Figure 6:
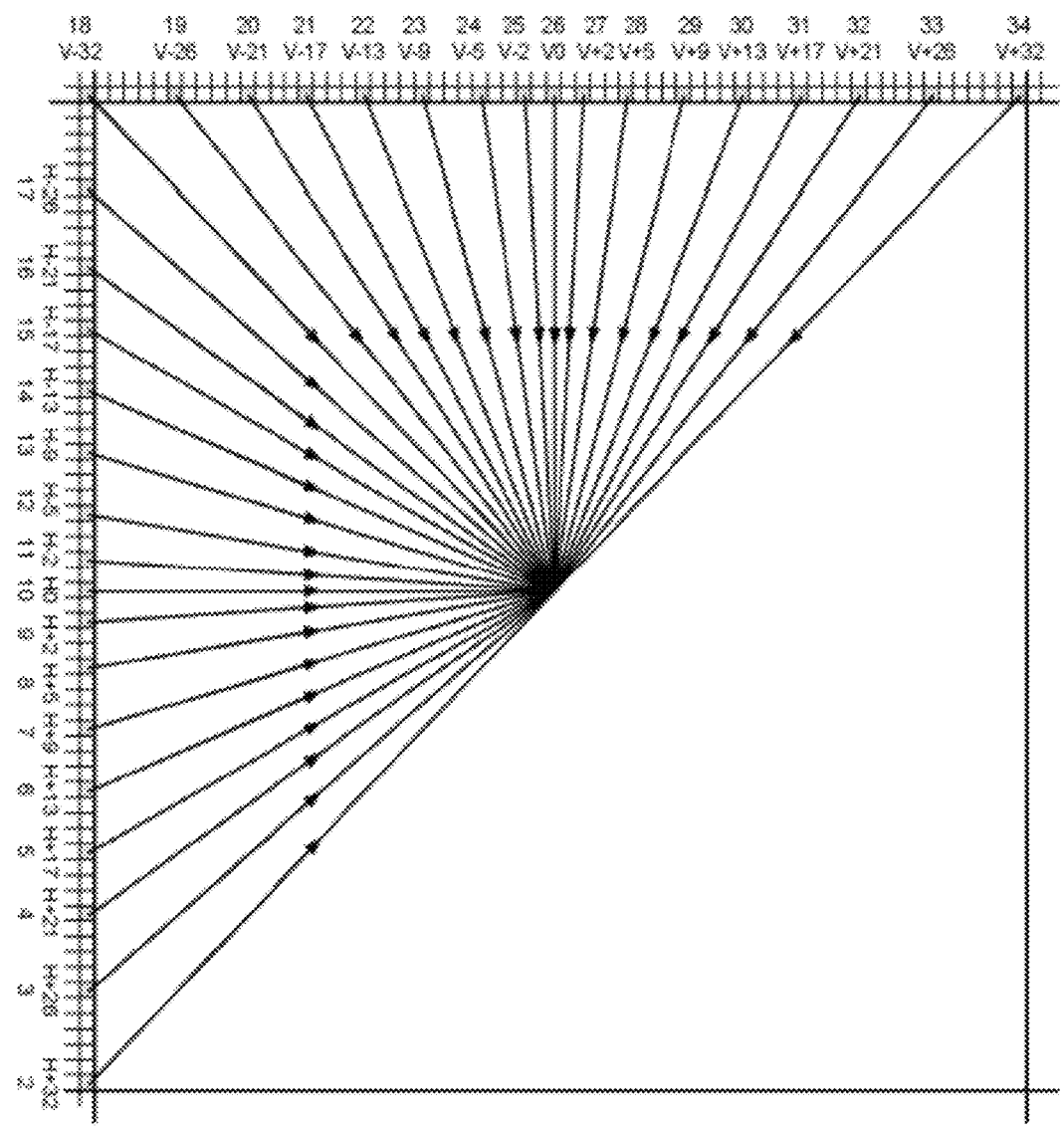
FIG. 6 schematically illustrates angular intra prediction directions and associated intra-prediction modes in HEVC.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Particular implementations of simplified PDPC could be performed differently, depending on the intra prediction mode used for deriving prediction values for samples of a current picture block.

For planar, DC, horizontal/vertical intra prediction modes (denoted as 0, 1, 18, 50 respectively in FIG. 7 and FIG. 8), the following steps can be performed:

The weighted prediction value of the sample $\hat{P}(x, y)$ for the prediction value of the sample $P(x, y)$ located at $(x, y)$ is calculated as follows:

$$P(x,y) = \text{Clip1Cmp}((wL \times R_{-1,y} + wT \times R_{x,-1} - wTL \times R_{-1,-1} + (64 - wl - wT + wTL) \times P(x,y) + 32)) >> 6) \quad (1)$$

where $R_{x,-1}$, $R_{-1,y}$ represent the reference samples located at top and left of the current sample $(x, y)$, and $R_{-1,-1}$ represents the reference sample located in the top-left corner of the current block, the function clip1Cmp is set as follows:

If cIdx specifying the color component of the current block is equal to 0, clip1Cmp is set equal to Clip1Y. Otherwise, clip1Cmp is set equal to Clip1C $$Clip1Y(x) = Clip3(0, (1 << BitDepth_Y) - 1, x)$$

$$Clip1Cc(x) = Clip3(0, (1 << BitDepth_C) - 1, x)$$

$$Clip3(x, y, z) = \begin{cases} x; & z < x \\ y; & z > y \\ z; & \text{otherwise} \end{cases}$$

$BitDepth_Y$ is the bit depth of luma samples.
$BitDepth_C$ is the bit depth of chroma samples.
$BitDepth_Y$ and $BitDepth_C$ could be signaled in sequence parameter set (SPS) of a bitstream.

Alternative definitions of Clip1Y(x) and Clip1C(x) are possible. In particular, as described by F. Galpin, P. Bordes, and F. Le Léannec in contribution JVET-C0040 "Adaptive Clipping in JEM2.0", $$\text{Clip1Cmp}(x) = Clip3(\min_C, \max_C, x),$$

where $\min_C$ is the lower clipping bound used in current slice for component ID C, $\max_C$ is the upper clipping bound used in current slice for component ID C, C is a color component (e.g., Y for luma, Cb and Cr for chroma).

The DC mode weights are calculated as follows:

$wT=32>>((y<<1)>>\text{shift})$, $wL=32>>((x<<1)>>\text{shift})$, $wTL=-(wL>>4)-(wT>>4)$, where shift=$(\log_2(\text{width})+\log_2(\text{height})+2)>>2$ and width and height are, respectively, the width and height of the current block in units of samples.

Figure 9:
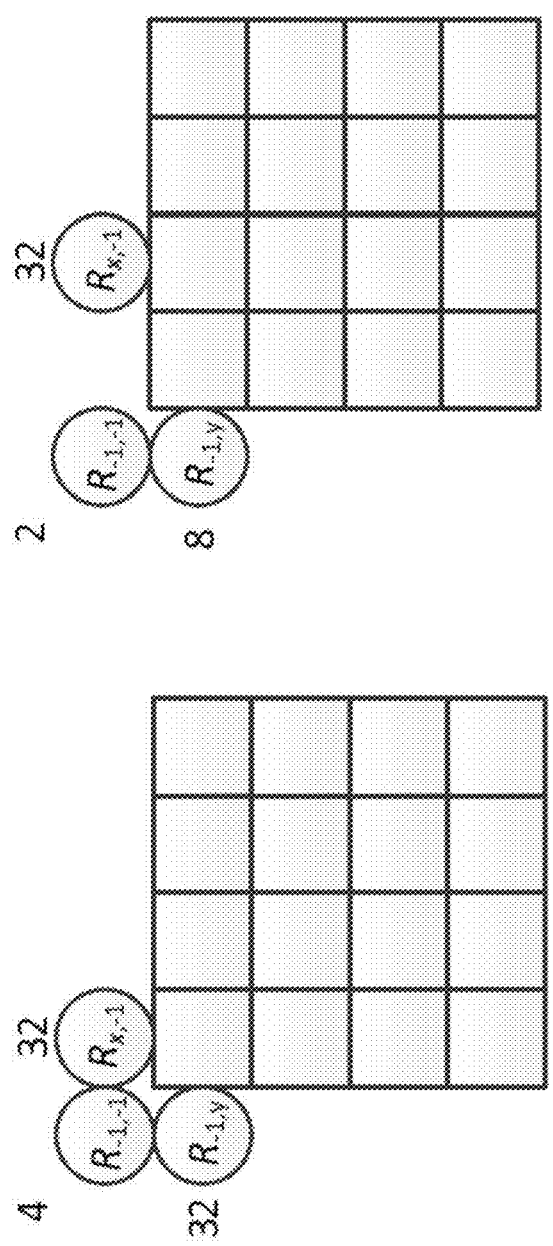
FIG. 9 schematically illustrates angular intra prediction directions and the associated intra-prediction modes in VTM-3.0 and VVC specification draft v.3.

For planar mode, wTL=0, while for the horizontal mode wTL=wT and for vertical mode wTL=wL. DC mode PDPC weights (wL, wT, wTL) for (0, 0) and (1, 0) positions inside one 4×4 block are shown in FIG. 9.

For diagonal (denoted as 2 and 66 in FIG. 7 and FIG. 8) and adjacent modes (directional modes not less than 58 and not greater than 10 in FIG. 7 or FIG. 8) processing is performed as described below using the same formula (1).

FIG. 10A illustrates the definition of reference samples $R_{x,-1}$, $R_{-1,y}$ and $R_{-1,-1}$ for the extension of PDPC to the top-right diagonal mode. The prediction sample pred(x', y') is located at (x', y') within the prediction block. The coordinate x of the reference sample $R_{x,-1}$ is given by:

$x=x'+y'+1$, and the coordinate y of the reference sample $R_{-1,y}$ is similarly given by:

$y=x'+y'+1$.

The PDPC weights for the top-right diagonal mode are:

$wT=16>>((y'<<1)>>\text{shift})$, $wL=16>>((x'<<1)>>\text{shift})$, $wTL=0$.

Similarly, FIG. 10B illustrates the definition of reference samples $R_{x,-1}$, $R_{-1,y}$ and $R_{-1,-1}$ for the extension of PDPC to the bottom-left diagonal mode. The coordinate x of the reference sample $R_{x,-1}$ is given by:

$x=x'+y'+1$, and the coordinate y of the reference sample $R_{-1,y}$ is:

$y=x'+y'+1$.

The PDPC weights for the top-right diagonal mode are:

$wT=16>>((y'<<1)>>\text{shift})$, $wL=16>>((x'<<1)>>\text{shift})$, $wTL=0$.

The case of an adjacent top-right diagonal mode is illustrated in FIG. 10C. The PDPC weights for an adjacent top-right diagonal mode are:

$wT=32>>((y'<<1)>>\text{shift})$, $wL=0$, $wTL=0$.

Similarly, the case of an adjacent bottom-left diagonal mode is illustrated in FIG. 10D. The PDPC weights for an adjacent bottom-left diagonal mode are:

$wL=32>>((x'<<1)>>\text{shift})$, $wT=0$, $wTL=0$.

The reference sample coordinates for the last two cases are computed using the tables that are already used for angular mode intra prediction. Linear interpolation of the reference samples is used if fractional reference sample coordinates are calculated.

Simplified PDPC could be performed as specified in the VVC specification. Further the following denotation are used:

$$invAngle = \text{Round}\left(\frac{256*32}{intraPredAngle}\right),$$

is the value of inverse angle,

Round(x) = Sign(x) * Floor(Abs(x) + 0.5), $$\text{Sign}(x) = \begin{cases} 1; & x > 0 \\ 0; & x == 0 \\ -1; & x < 0 \end{cases}$$

Floor(x) is the largest integer less than or equal to x,
Log 2(x) is the base-2 logarithm of x.
intraPredAngle is the angle parameter specified in Table 6,
A=C ? B:D is a ternary assignment operation, where A is set equal to B if condition C is true. Otherwise, if condition C is false, A is set equal to D.
INTRA_PLANAR is a planar intra prediction mode ( ),
INTRA_DC is a DC intra prediction mode,
INTRA_ANGULARXX is a one of directional intra prediction modes, where XX denotes its number and corresponding direction shown in FIG. 8.

If a term is not explained herein, it is understood that its definition can be found in the VVC specification or HEVC/H.265 standard specification.

Given the denotations above, an embodiment of the steps of simplified PDPC can be defined as follows:
Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 ... nTbW−1, y=0 ... nTbH−1,
the neighboring samples p[x][y], with x=−1, y=−1 ... refH−1 and x=0 ... refW−1, y=−1,
a variable cIdx specifying the color component of the current block.

Outputs of this process are the modified predicted samples predSamples[x][y] with x=0 ... nTbW−1, y=0 ... nTbH−1.

Depending on the value of cIdx, the function clip1Cmp is set as follows:
If cIdx is equal to 0, clip1Cmp is set equal to Clip1$_Y$.
Otherwise, clip1Cmp is set equal to Clip1$_C$.

The variable nScale is set to ((Log 2(nTbW)+Log 2(nTbH)−2)>>2).

The reference sample arrays mainRef[x] and sideRef[y], with x=0 ... refW−1 and y=0 ... refH−1 are derived as follows:

mainRef[x]=p[x][−1]

sideRef[y]=p[−1][y]

The variables refL[x][y], refT[x][y], wT[y], wL[x] and wTL[x][y] with x=0 ... nTbW−1, y=0 ... nTbH−1 are derived as follows:

If predModeIntra is equal to INTRA_PLANAR, INTRA_DC, INTRA_ANGULAR18, or INTRA_ANGULAR50, the following applies:

$refL[x][y]=p[-1][y]$ $refT[x][y]=p[x][-1]$ $wT[y]=32>>((y<<1)>>nScale)$ $wL[x]=32>>((x<<1)>>nScale)$ $wTL[x][y]=(predModeIntra==INTRA\_DC)\ ?\ ((wL[x]>>4)+(wT[y]>>4)):0$ Otherwise, if predModeIntra is equal to INTRA_ANGULAR2 or INTRA_ANGULAR66, the following applies:

$refL[x][y]=p[-1][x+y+1]$ $refT[x][y]=p[x+y+1][-1]$ $wT[y]=(32>>1)>>((y<<1)>>nScale)$ $wL[x]=(32>>1)>>((x<<1)>>nScale)$ $wTL[x][y]=0$ Otherwise, if predModeIntra is less than or equal to INTRA_ANGULAR10, the following ordered steps apply:
1. The variables dXPos[y], dXFrac[y], dXInt[y] and dX[x][y] are derived as follows using invAngle:

$dXPos[y]=((y+1)*invAngle+2)>>2$ $dXFrac[y]=dXPos[y]\&\ 63$ $dXInt[y]=dXPos[y]>>6$ $dX[x][y]=x+dXInt[y]$ 2. The variables refL[x][y], refT[x][y], wT[y], wL[x] and wTL[x][y] are derived as follows:

$refL[x][y]=0$ $refT[x][y]=(dX[x][y]<refW-1)\ ?\ ((64-dXFrac[y])*mainRef[dX[x][y]]+dXFrac[y]*mainRef[dX[x][y]+1]+32)>>6:0$ (Eq. 1)

$wT[y]=(dX[x][y]<refW-1)?32>>((y<<1)>>nScale):0$ $wL[x]=0$ $wTL[x][y]=0$

Otherwise, if predModeIntra is greater than or equal to INTRA_ANGULAR58 (see FIG. 8), the following ordered steps apply:

1. The variables dYPos[x], dYFrac[x], dYInt[x] and dY[x][y] are derived as follows using invAngle as specified in below depending on intraPredMode:

$dYPos[x]=((x+1)*invAngle+2)>>2$ $dYFrac[x]=dYPos[x]\&\ 63$ $dYInt[x]=dYPos[x]>>6$ $dY[x][y]=y+dYInt[x]$ 2. The variables refL[x][y], refT[x][y], wT[y], wL[x] and wTL[x][y] are derived as follows:

$refL[x][y]=(dY[x][y]<refH-1)\ ?\ ((64-dYFrac[x])*sideRef[dY[x][y]]+dYFrac[x]*sideRef[dY[x][y]+1]+32)>>6:0$ (Eq. 2)

$refT[x][y]=0$ $wT[y]=0$ $wL[x]=(dY[x][y]<refH-1)\ ?\ 32>>((x<<1)>>nScale):0$ $wTL[x][y]=0$ Otherwise, refL[x][y], refT[x][y], wT[y], wL[x] and wTL[x][y] are all set equal to 0.

The values of the modified predicted samples predSamples[x][y], with x=0 ... nTbW−1, y=0 ... nTbH−1 are derived as follows:

$predSamples[x][y]=clip1Cmp((refL[x][y]*wL[x]+refT[x][y]*wT[y]-p[-1][-1]*wTL[x][y]+(64-wL[x]-wT[y]+wTL[x][y])*predSamples[x][y]+32)>>6)$ In assignment Eq. 1 above simplified PDPC may use nearest-neighbor interpolation instead of linear one:

$refT[x][y]=(dX[x][y]<refW-1)\ ?\ mainRef[dX[x][y]]:0$

Similarly, assignment Eq. 2 could also use nearest-neighbor interpolation:

$refL[x][y]=(dY[x][y]<refH-1)\ ?\ sideRef[dY[x][y]]:0$

Figure 7:
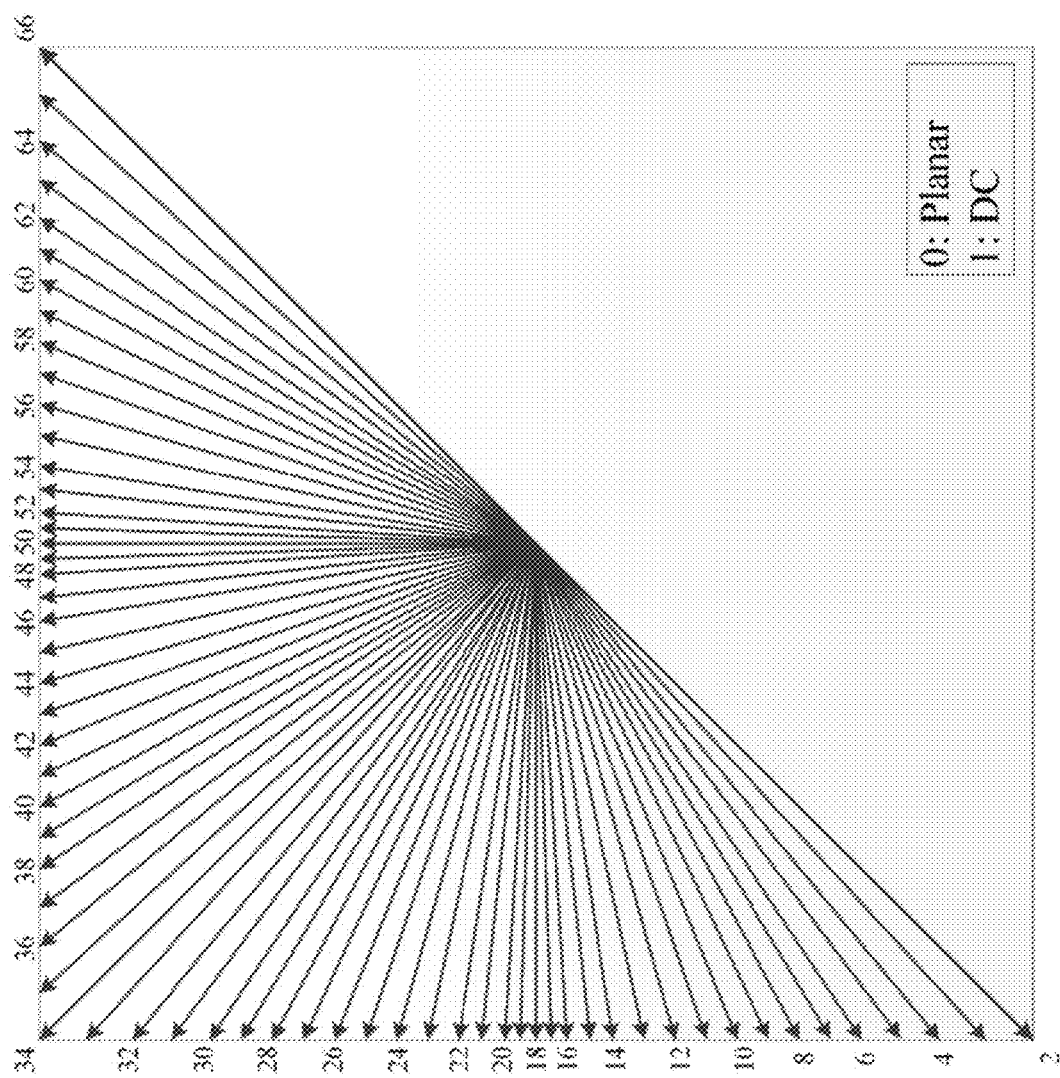
FIG. 7 schematically illustrates angular intra prediction directions and associated intra-prediction modes in JEM.
Figure 8:
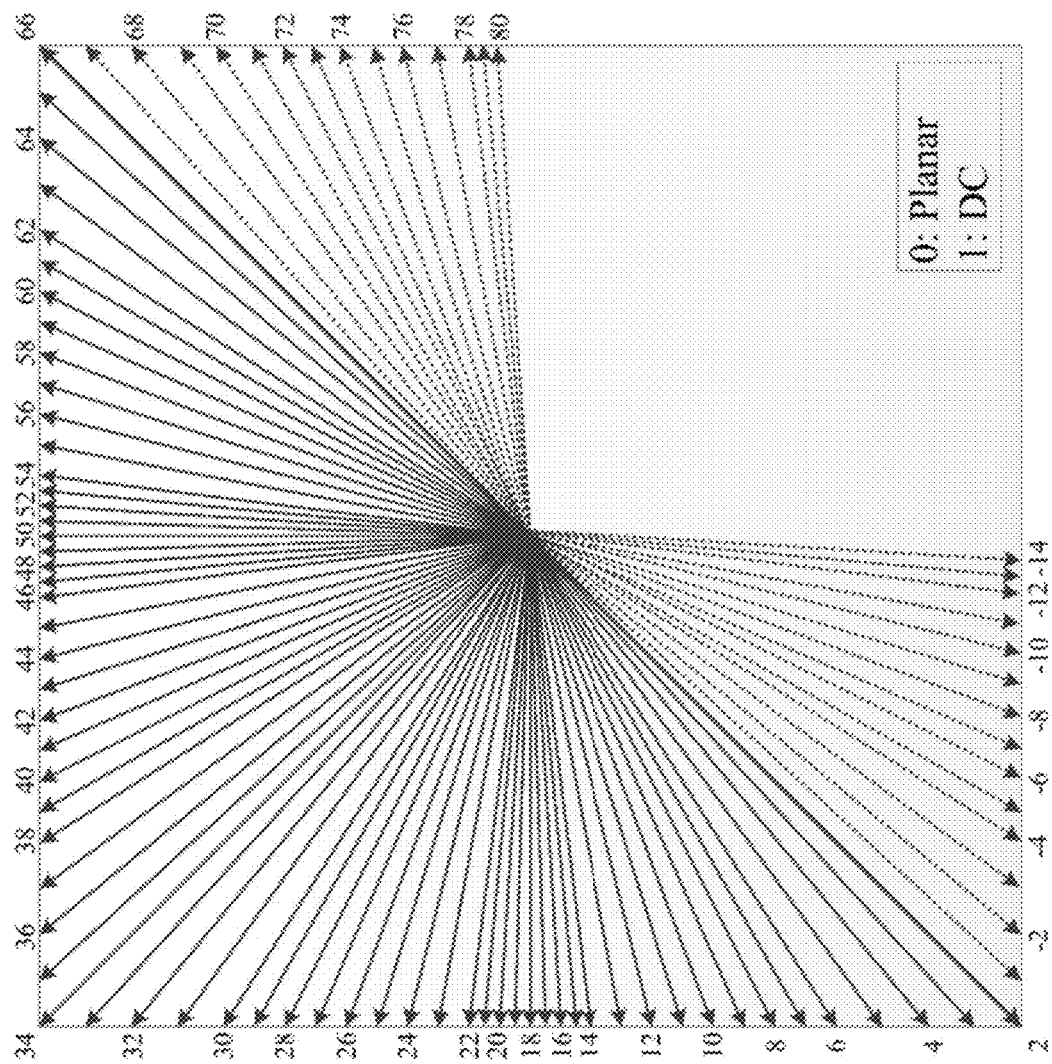
FIG. 8 schematically illustrates angular intra prediction directions and associated intra-prediction modes in VTM-3.0 and VVC specification draft v.3.

Thus, at both encoder and decoder sides, proposed method uses the following as the input data:
- directional intra prediction mode (denoted further as predModeIntra, which is shown in FIG. 7 and FIG. 8)
- block size parameter nTbS, which is set equal to (log 2(nTbW)+Log 2(nTbH))>>1, where nTbW and nTbH denote width and height of the predicted block, respectively, and ">>" denotes a right-shift operation.

The modification of the VVC specification that enables usage of the proposed method may comprise substituting "the neighboring samples p[x][y]" by "the reference samples p[x][y]" in the section describing simplified PDPC.

The angle parameter intraPredAngle denotes the subpixel offset between two adjacent rows of predicted samples in fixed point representation having length of fractional part equal to 5-bits. This parameter could be derived from the intra prediction mode is derived from predModeIntra and. An exemplary derivation of intraPredAngle from predModeIntra could be defined with a LUT, e.g., as it is shown in Table 1.

TABLE 1

| An exemplary LUT to derive intraPredAngle from predModeIntra. | | | | | | | | | | | | | | |
|---|---|---|---|---|---|---|---|---|---|---|---|---|---|---|
| Wide angle modes for NxM blocks, M > N | | | | | | | | | | | | | | |
| predModeIntra | −14 | −13 | −12 | −11 | −10 | −9 | −8 | −7 | −6 | −5 | −4 | −3 | −2 | −1 |
| intraPredAngle | 512 | 341 | 256 | 171 | 128 | 102 | 86 | 73 | 64 | 57 | 51 | 45 | 39 | 35 |
| Modes in the range of [2; HOR_IDX) | | | | | | | | | | | | | | |
| predModeIntra | 2 | 3 | 4 | 5 | 6 | 7 | 8 | 9 | 10 | 11 | 12 | 13 | 14 | 15 | 16 | 17 |
| intraPredAngle | 32 | 29 | 26 | 23 | 20 | 18 | 16 | 14 | 12 | 10 | 8 | 6 | 4 | 3 | 2 | 1 |

TABLE 1-continued

An exemplary LUT to derive intraPredAngle from predModeIntra.

Modes in the range of [HOR_IDX; DIA_IDX)

| predModeIntra | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|
| intraPredAngle | 0 | −1 | −2 | −3 | −4 | −6 | −8 | −10 | −12 | −14 | −16 | −18 | −20 | −23 | −26 | −29 |

Modes in the range of [DIA_IDX; VER_DX)

| predModeIntra | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|
| intraPredAngle | −32 | −29 | −26 | −23 | −20 | −18 | −16 | −14 | −12 | −10 | −8 | −6 | −4 | −3 | −2 | −1 |

Modes in the range of [VER_IDX; VDIA_IDX]

| predModeIntra | 50 | 51 | 52 | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|---|---|---|
| intraPredAngle | 0 | 1 | 2 | 3 | 4 | 6 | 8 | 10 | 12 | 14 | 16 | 18 | 20 | 23 | 26 | 29 | 32 |

Wide angle modes for NxM blocks, M < N

| predModeIntra | 67 | 68 | 69 | 70 | 71 | 72 | 73 | 74 | 75 | 76 | 77 | 78 | 79 | 80 |
|---|---|---|---|---|---|---|---|---|---|---|---|---|---|---|
| intraPredAngle | 35 | 39 | 45 | 51 | 57 | 64 | 73 | 86 | 102 | 128 | 171 | 256 | 341 | 512 |

Figure 11:
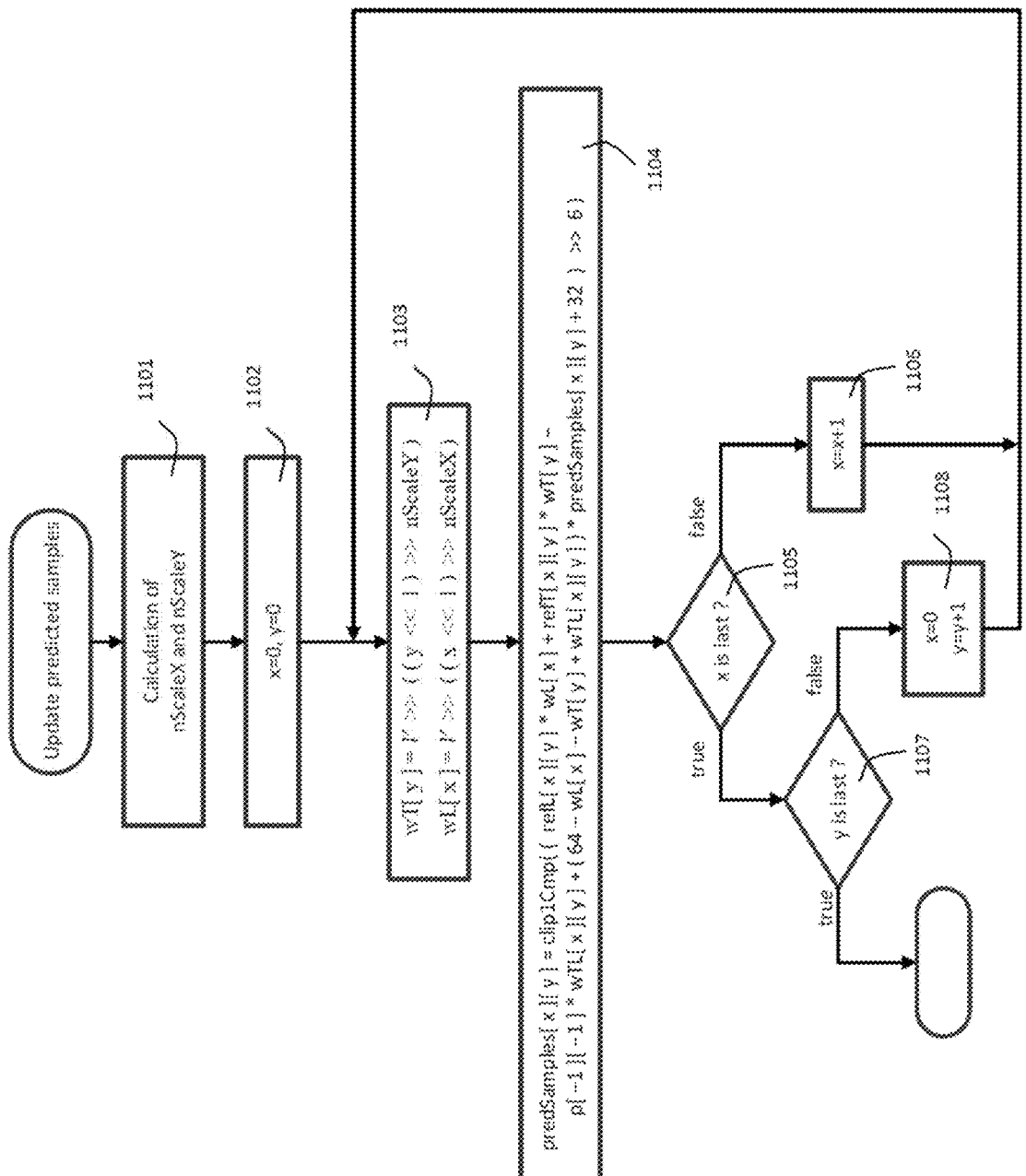
FIG. 11 schematically illustrates an example of intra-predicting a block from reference samples of the main reference side.

Herein, it is, particularly, proposed to update predicted samples that were obtained from the reference samples using directional, planar or DC intra prediction modes. The steps of the update procedure are shown in FIG. 11. The first step 1101 is to calculate scale values nScaleX and nScaleY depending on the block shape and size. An implementation form of this calculation is described further in FIG. 13.

Steps 1103 and 1104 are performed within a loop over all predicted samples positions. Initialization of the loop iterators x and y is performed in step 1102, iterators' boundary checks are performed by steps 1105 and 1107, iterator increments are performed in steps 1106 and 1108. Step 1108 resets iterators x and y to the start of the next row, i.e. x is set equal to zero and row iterator y is incremented by 1.

Step 1103 consists in calculating the position-dependent weight values wL[x] and wT[y]. These weight values are obtained by right-shifting the base value V. The value V is connected with the right shift operation of step 4. If this right-shift is set to s, the practical value of V could be defined, e.g., as $2^s$, $2^{s-1}$ or $2^s$. In the exemplary embodiment shown in FIG. 11 the value of s is set equal to 6, and the value of V is set equal to 32, i.e. $2^5$.

In contrast to the state-of-the-art methods, wL[x] and wT[y] in step 1103 uses different values of scales nScaleX and nScaleY, respectively. These weight values wL[x] and wT[y] are further used in step 1104 to calculate the modified value of predicted samples.

Figure 12:
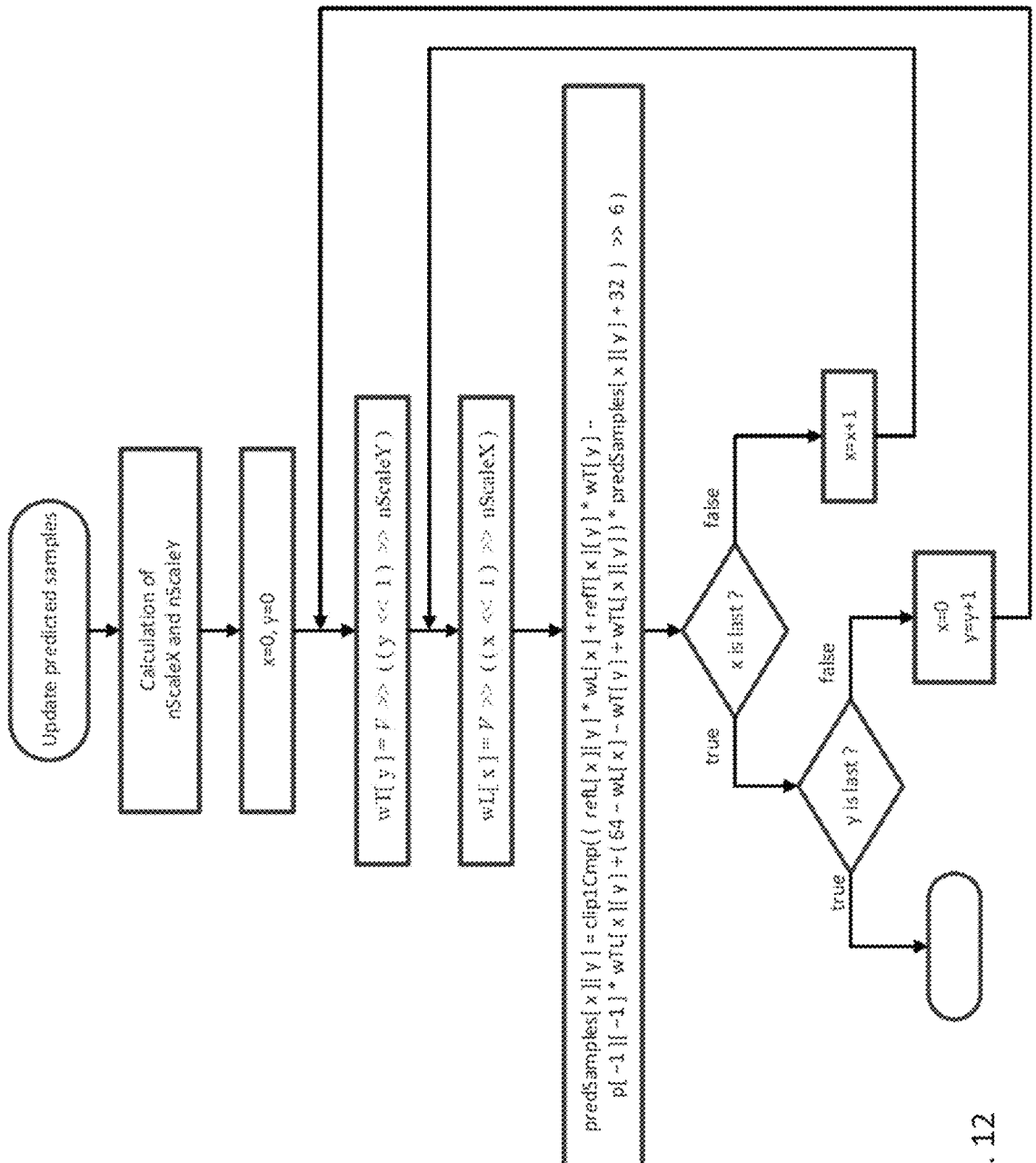
FIG. 12 illustrates an example of DC mode PDPC weights for (0, 0) and (1, 0) positions inside a 4×4 block.

An, alternative embodiment of predicted samples update is given in FIG. 12. In this embodiment weight wT[y] is recalculated only once per row, i.e. when iterator y is incremented.

Due to the QTBT and MTT partitioning, prediction blocks may be non-square (generally, rectangular) shape. However, state-of-the-art PDPC does not consider potential non-equality of width and height of a prediction block. Weighting mechanism based just on a value of distance to the left and top sides of predicted block may lead to predicted samples being too smooth if predicted block aspect ratio is different from 1. In the present disclosure, it is proposed to balance the effect of the block size and block aspect ratio using intra-prediction mode. Using directionality information provided by intra-prediction mode it is possible to determine the propagation distance and directionality of the PDPC smoothing effect. Hence it is proposed to introduce a group of intra prediction mode and to apply dedicated weight scaling adaptation for each of the group. In this case even long prediction blocks will use smoothing in accordance with the length of the side where it is appropriate according to the intra prediction mode and prediction block dimensions.

It is suggested to use separate nScale values when deriving weights wT[y] and wL[x]. Particularly, in the description above (step 1103) the following formulas will be used (value of V is set accordingly to either 16 or 32):

$$wT[y]=V>>((y<<1)>>nScaleY)$$

$$wL[x]=V>>((x<<1)>>nScaleX)$$

Figure 13:
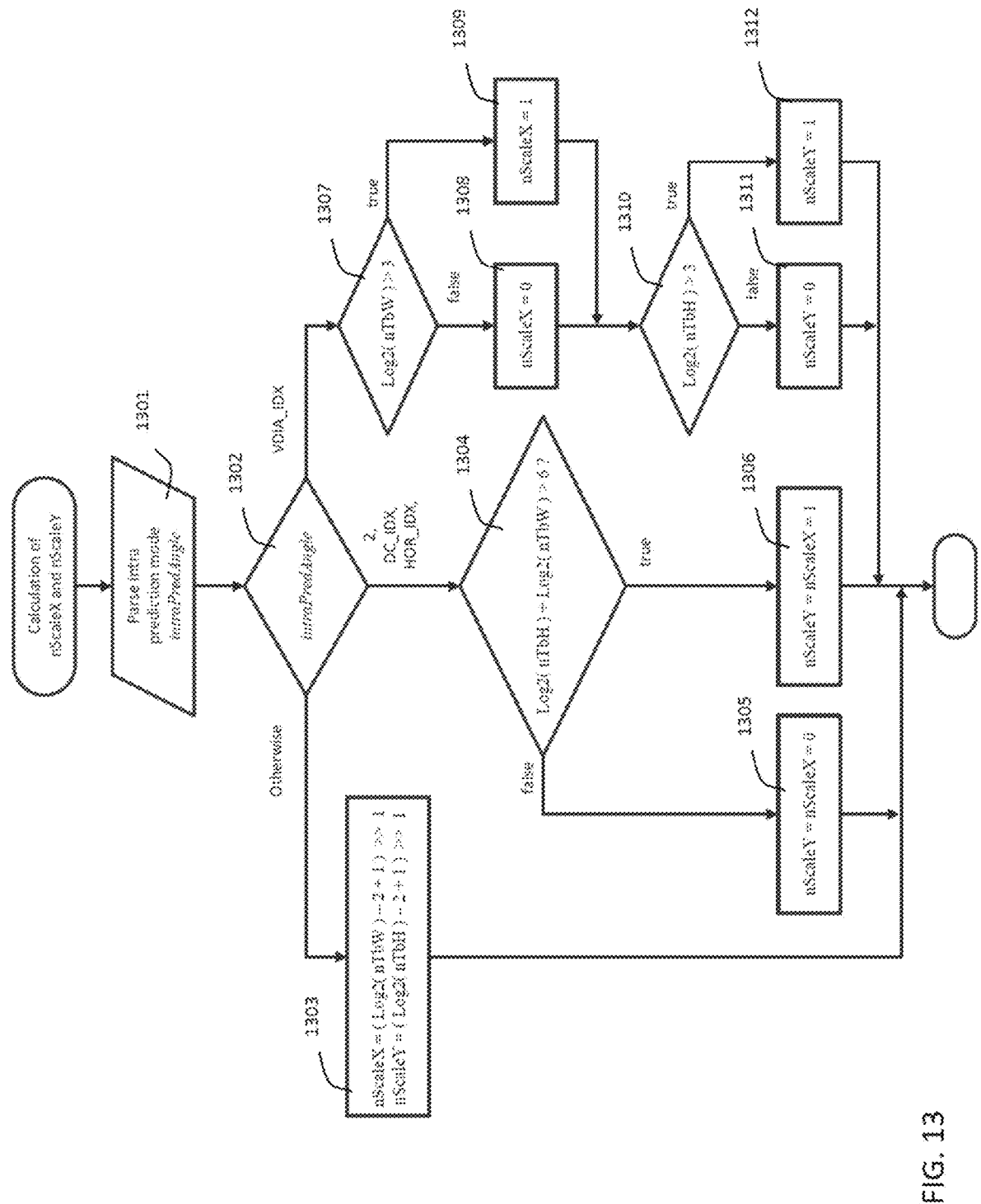
FIG. 13 schematically illustrates an example of a method of determining a vertical and a horizontal scaling factor.

Calculation of scales (step 1101 of FIG. 11) could be performed as it is shown in FIG. 13. The first step 1301 is to get the value of the intra prediction mode intraPredAngle of the predicted block, e.g., by parsing from the bitstream. The next step 1302 consists in classifying the intra prediction mode onto one of the groups.

The further definition of skew non-diagonal intra prediction mode is used further:
intraPredMode is skew non-diagonal if intraPredMode is not equal to 2 or VDIA_IDX and one of the following is true: intraPredMode is not less than VDIA_IDX−numModes or intraPredMode is not greater than 2+numModes.

Exemplary classification is given in Table 2.

TABLE 2

Class index derivation based on intra prediction mode.

| Group of intra prediction modes | 2, DC_IDX, HOR_IDX, | VDIA_IDX | Other modes |
|---|---|---|---|
| Class index | 1 | 2 | 0 |

Depending on the mode class index, the derivation of nScaleX and nScaleY could be different. Steps 1303, ..., 1312 represent the mapping of the class index to the derivation formulas shown in Table 3.

TABLE 3

Mapping of the class index to the derivation method of nScaleX and nScaleY.

| Class index | Derivation method |
|---|---|
| 0 | nScaleX = ( Log2( nTbW ) − 2 + 1 ) >> 1<br>nScaleY = ( Log2( nTbH ) − 2 + 1 ) >> 1 |
| 1 | nScaleX = nScaleX = ( Log2( nTbH ) + Log2( nTbW ) ) > 6 ? 1 : 0 |

TABLE 3-continued

Mapping of the class index to the derivation
method of nScaleX and nScaleY.

| Class index | Derivation method |
|---|---|
| 2 | nScaleX = Log2( nTbW ) > 3 ? 1 : 0<br>nScaleY = Log2( nTbH ) > 3 ? 1 : 0 |

Alternative classifications are given in Tables 4, 5 and 6.

TABLE 4

Alternative class index derivation
based on intra prediction mode.

| Group of intra prediction modes | DC_IDX, HOR_IDX, VER_IDX | 2, VDIA_IDX | Other modes |
|---|---|---|---|
| Class index | 1 | 2 | 0 |

TABLE 5

Alternative class index derivation
based on intra prediction mode.

| Group of intra prediction modes | DC_IDX, HOR_IDX, VER_IDK | 2, VDIA_IDX | Other modes |
|---|---|---|---|
| Class index | 2 | 1 | 0 |

TABLE 6

Alternative class index derivation
based on intra prediction mode.

| Group of intra prediction modes | DC_IDX, HOR_IDX, VER_IDX | Diagonal modes with integer subpixel step: −14 −12 −10 −6, 2, VDIA_IDX, 72, 76, 78, 80 | Other modes |
|---|---|---|---|
| Class index | 2 | 1 | 0 |

In Table 6, Class 1 is specified for not only diagonal modes, but for wide-angle modes that has non-fractional IntraPredAngle value (i.e. a multiple of 32 in Table 1).

According to the present invention it is essential not to apply predicted sample update (weightening) steps in case of the certain combinations of conditions, particularly, related to block sizes and intra prediction modes (intraPredMode).

Particular implementations may comprise the following conditions of disabling PDPC, i.e., not performing predicted sample update (weightening):

a sum of width of the block and a height of the block is greater than 64 samples and either intraPredMode is skew non-diagonal or it is equal to PLANAR_IDX.

Different combinations of size-dependent restrictions can be selectively applied to those intra prediction modes where PDPC is used. In particular, the following combinations are feasible:

1. PDPC is disabled for blocks that meet the following conditions: (width+height<=8) or (width+height>64).
2. PDPC is disabled for blocks that meet the following conditions: (width+height<=8) or (width+height>64), if the mode selected in these blocks is either planar (PLANAR_IDX) or one of the skew non-diagonal modes satisfied the following inequality: ((predMode>=VDIA_IDX−numModes && predMode !=VDIA_IDX)||(predMode !=2 && predMode<=(2+numModes))), where numModes=8, where numModes=8 by default; predMode is the index of selected intra prediction mode.
3. PDPC is disabled for blocks that meet the following conditions:
   a. (width+height<=8) for any intra prediction mode that PDPC is applied to;
   b. (width+height>64), if the mode selected in these blocks is either planar (PLANAR_IDX) or one of the skew non-diagonal modes satisfied the following inequality: ((predMode>=VDIA_IDX−numModes && predMode !=VDIA_IDX)||(predMode !=2 && predMode<=(2+numModes))).
4. PDPC is disabled for blocks that meet the following conditions:
   a. (width+height<=8) for any intra prediction mode that PDPC is applied to;
   b. (width+height>64), if the mode selected in these blocks is planar (PLANAR_IDX).
5. PDPC is disabled for blocks that meet the following conditions:
   a. (width+height<=8) for any intra prediction mode that PDPC is applied to;
   b. (width+height>64), if the mode selected in these blocks is one of the skew non-diagonal modes satisfied the following inequality: ((predMode>=VDIA_IDX−numModes && predMode !=VDIA_IDX)||(predMode !=2 && predMode<=(2+numModes))).
6. PDPC is disabled for blocks that meet the following conditions:
   a. (width+height<=8)
   b. the mode selected in these blocks is either planar (PLANAR_IDX) or one of the skew non-diagonal modes satisfied the following inequality: ((predMode>=VDIA_IDX−numModes && predMode !=VDIA_IDX)||(predMode !=2 && predMode<=(2+numModes))).
7. PDPC is disabled for chroma blocks that meet the following conditions: (width+height<=8) or (width+height>64);
8. PDPC is disabled for chroma blocks that meet the following conditions:
   a. (width+height<=8);
   b. Cross-component linear modeling mode is used to predict these chroma blocks.
9. PDPC is disabled for chroma blocks that meet the following conditions:
   a. (width+height<=8) and cross-component linear modeling mode is used to predict these chroma blocks;
   b. (width+height>64).
10. PDPC is disabled for chroma blocks that meet the following conditions:
    a. (width+height<=8);
    b. the mode selected in these blocks is planar (PLANAR_IDX).
11. PDPC is disabled for chroma blocks that meet the following conditions:
    a. (width+height<=8);
    b. the mode selected in these blocks is one of the skew non-diagonal modes satisfied the following inequality: ((predMode>=VDIA_IDX−numModes && predMode !=VDIA_IDX)||(predMode !=2 && pred-
Mode<=(2+numModes))).
12. PDPC is disabled for chroma blocks that meet the following conditions:
   a. (width+height<=8);
   b. Cross-component linear modeling mode is used to predict these chroma blocks or the mode selected in these blocks is planar (PLANAR_IDX).
13. PDPC is disabled for chroma blocks that meet the following conditions:
   a. (width+height<=8);
   b. Cross-component linear modeling mode is used to predict these chroma blocks or the mode selected in these blocks is one of the skew non-diagonal modes satisfied the following inequality: ((predMode>=VDIA_IDX−numModes && predMode !=VDIA_IDX)||(predMode !=2 && predMode<=(2+numModes))).
14. PDPC is disabled for chroma blocks that meet the following conditions:
   a. (width+height<=8) or (width+height>64);
   b. Cross-component linear modeling mode is used to predict these chroma blocks or the mode selected in these blocks is either planar (PLANAR_IDX) or one of the skew non-diagonal modes satisfied the following inequality: ((predMode>=VDIA_IDX−numModes && predMode !=VDIA_IDX)||(predMode !=2 && predMode<=(2+numModes))).
15. PDPC is disabled for chroma blocks that meet the following conditions:
   a. (width+height<=8) and cross-component linear modeling mode is used to predict these chroma blocks or the mode selected in these blocks is either planar (PLANAR_IDX) or one of the skew non-diagonal modes satisfied the following inequality: ((predMode>=VDIA_IDX−numModes && predMode !=VDIA_IDX)||(predMode !=2 && predMode<=(2+numModes)));
   b. (width+height>64) and the mode selected in these blocks is either planar (PLANAR_IDX) or one of the skew non-diagonal modes satisfied the following inequality: ((predMode>=VDIA_IDX−numModes && predMode !=VDIA_IDX)||(predMode !=2 && predMode<=(2+numModes))).
16. Different combinations of the above mentioned restrictions.

Figure 14:
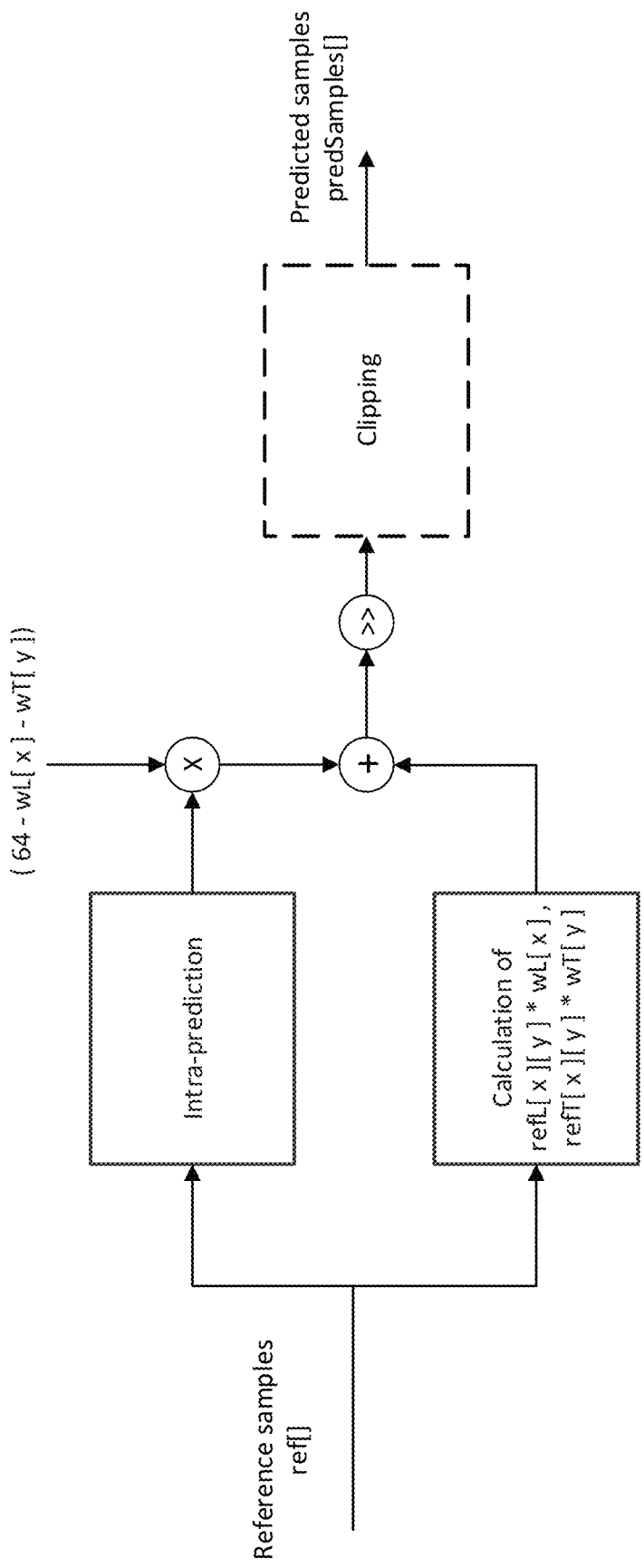
FIG. 14 illustrates an example of intra-predicting a block of samples.

FIG. 14 illustrates the above-described method. By dashed line the step of clipping is shown, that is performed in the state-of-the-art PDPC, but is not performed in the proposed method, since it is not required, because the only negative coefficient wTL is not used.

Figure 10:
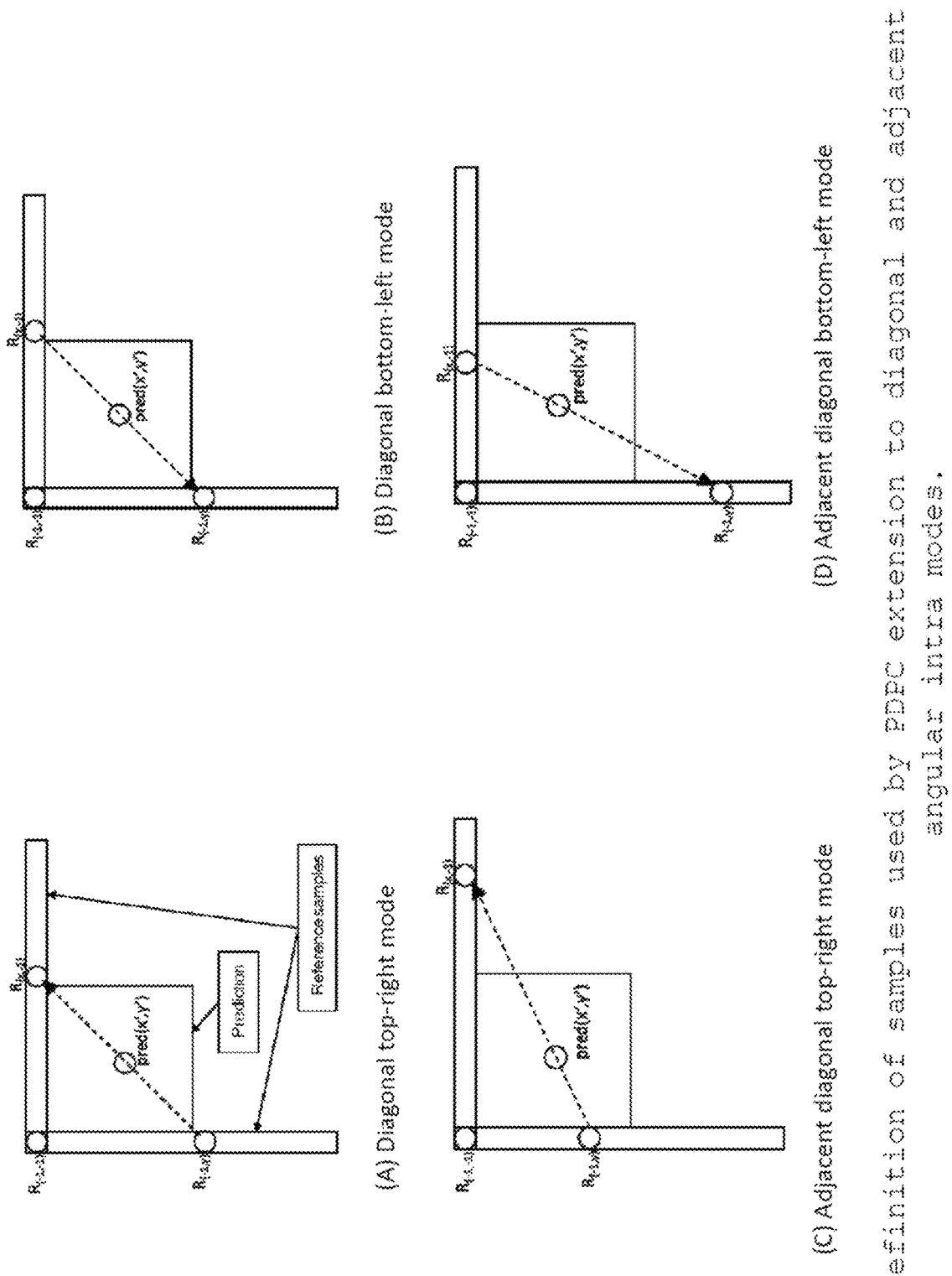
FIG. 10 schematically illustrates an example of DC mode PDPC weights for (0, 0) and (1, 0) positions inside a 4×4 block.

In FIG. 10 reference samples are used by the intra prediction process to produce predicted samples. Each predicted sample is further weighted using a sample weighting factor. The sample weighting factor may, for example, be equal to (64−wL[x]−wT[y]). The same reference samples are used to calculate additional values for each of the predicted samples depending on x and y, where x and y define the position of a predicted sample within a predicted block. These additional values are added to corresponding weighted predicted samples. Each sample resulting from this operation is then normalized by right-shifting it according to the predetermined precision of the sample weighting factor. For example, if the sample weighting factor is defined as (64−wL[x]−wT[y])) the precision is 6 bits. Therefore, at this step a right-shift by 6 is performed in order to ensure that possible minimum and maximum values of the output values are the same as the possible minimum and maximum values of the reference samples.

One of the beneficial effects of the proposed solution is that the PLANAR intra prediction mechanism can be reused to calculate the additional values. Specifically, PLANAR intra prediction uses the following equation to derive horizontal and vertical predicted sample values:

$$predV[x][y]=((nTbH-1-y)*p[x][-1]++(y+1)*p[-1][nTbH])<<\text{Log }2(nTbW)$$

$$predH[x][y]=((nTbW-1-x)*p[-1][y]++(x+1)*p[nTbW][-1])<<\text{Log }2(nTbH).$$

From the two above equations it can be seen that predV[x][y] uses reference sample p[x][−1] located in the same column as predV[x][y] does and predH[x][y] uses the reference sample p[−1][y] located on the same row with predH[x][y]. Besides, left-shift operations are performed as the final step and thus can be skipped since they do not affect intermediate calculations that are being reused. nTbW, nTbH, x and y variables are inputs of PLANAR intra prediction method and thus could be adjusted correspondingly. Because of that it is possible to substitute (nTbW−1−x) by $D_x$ and (nTbH−1−y) by $D_y$ input variables. Bottom-left and top-right reference samples could be set to 0 since these are not a parameter of The similar modification could be performed for Considering the above-described observations, equations above may be rewritten in accordance with its inputs being predetermined:

$$V_y=Dy*p[x][-1]$$

$$V_x=Dx*p[-1][y]$$

Thus, in embodiments, the following unifications could be performed:
   an additional value in case of horizontal mode (mode 18) could be calculated as $V_y=Dy*p[x][-1]$, wherein $D_y$ is set equal to wT[y];
   an additional value in case of vertical mode (mode 50) could be calculated as $V_x=Dx*p[-1][y]$, wherein $D_x$ is set equal to wL[y];
   an additional value in case of DC mode (mode 1) could be calculated as $V_y+V_x$, wherein $D_x$ and $D_y$ are set as in the previous two cases.

By alternation of reference sample selection, it could be shown that unification could be performed for all the intra prediction modes that are specified for PDPC process.

When intra prediction mode is specified to be equal to DC, horizontal or vertical intra prediction modes, the resulting updated predicted sample should be clipped, e.g. as it is shown in FIG. 14 by a block with dashed border.

In case of horizontal or vertical intra prediction mode it is more beneficial to reposition the clipping operation before the last step of simplified PDPC when weighted predicted sample is being summed with an additional value. This additional value is obtained differently for different modes as described above.

Thresholding could be applied to the results of intermediate calculations that are performed to obtain the additional value for the cases of vertical, horizontal or DC intra prediction modes. In cases when this approach is applied an additional value could be calculated in such a way that being added to the weighted predicted sample it will not require clipping operation. For example, this could be achieved using the following calculation disclosed below.

Figure 15:
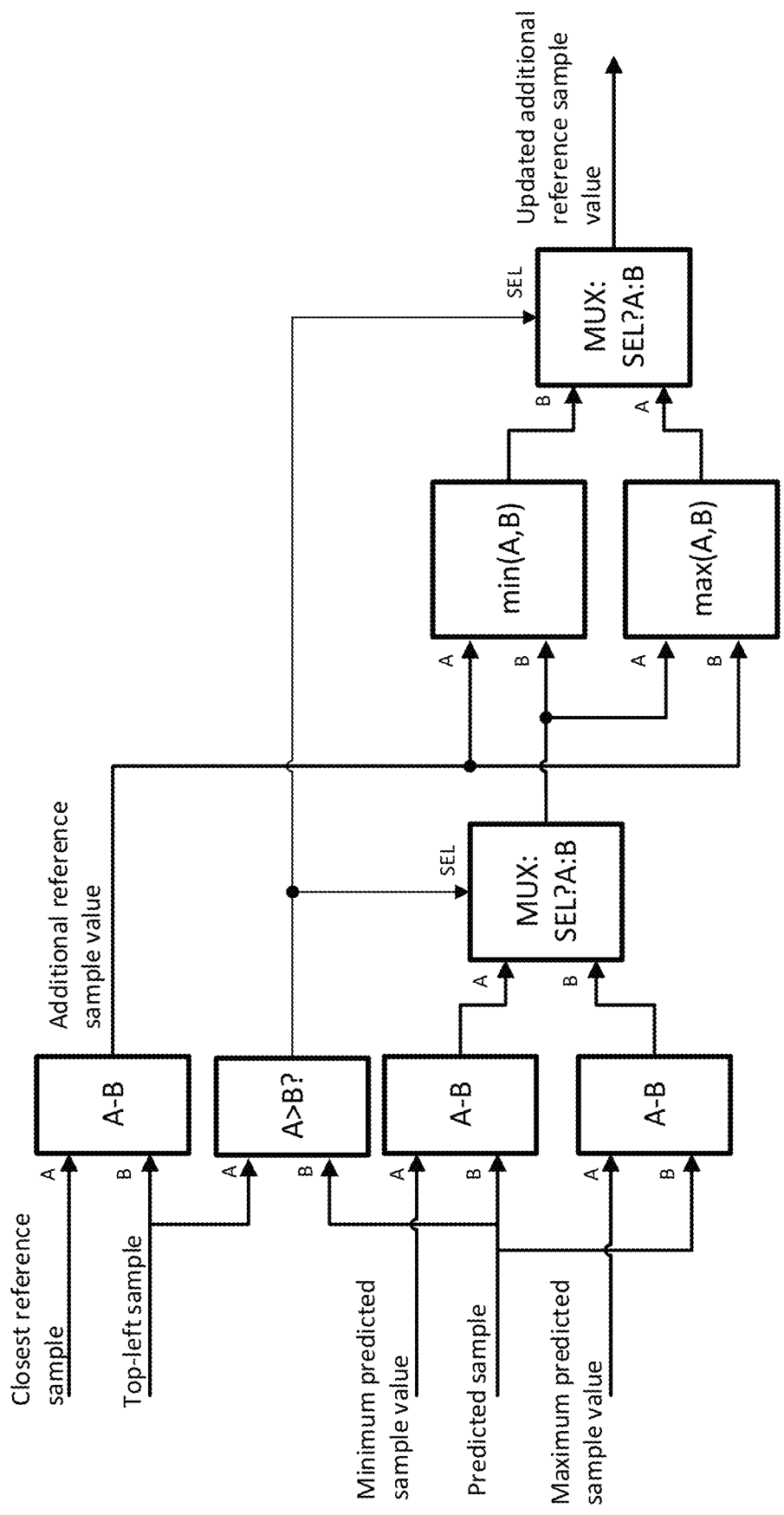
FIG. 15 illustrates another example of intra-predicting a block of samples.

In accordance with the intra prediction mode, one or several additional reference sample values, wherein:

when the intra prediction mode is vertical, additional reference value is set equal to the difference between the value of the nearest/closest reference sample located above the predicted sample and the top-left reference sample, when the intra prediction mode is horizontal, additional reference value is set equal to the difference between the value of the nearest/closest reference sample located to the left of the predicted sample and the top-left reference sample, when the intra prediction mode is a DC intra prediction mode, the first additional reference sample value and the second additional reference sample value are obtained by setting the first additional reference sample value equal to the nearest/closest reference sample located to the left of the predicted sample, and setting the second additional reference sample value equal to the nearest/closest reference sample located above the predicted sample; When the intra prediction mode is either horizontal or vertical, the additional reference sample value is thresholded (e.g. as shown in FIG. 15). Finally, an additional value is calculated either:

as a weighted sum of the first additional reference sample and the second additional reference sample when the intra prediction mode is a DC intra prediction mode, or by multiplying weighting factor by the additional reference sample value when the intra prediction mode is either horizontal or vertical.

Thresholding of additional reference sample value is in fact updating the additional reference sample value in accordance with whether top-left reference sample is greater than predicted sample. Specifically:

when the top-left reference sample is greater than the predicted sample, the upper limit is obtained by subtracting predicted sample value from the maximum value of the predicted sample, the updated additional reference sample value is set equal to the maximum of two values, wherein the first value is the additional reference sample value, and the second value is the upper limit, otherwise, the lower limit is obtained by subtracting predicted sample value from the minimum value of the predicted sample, the updated additional reference sample value is set equal to the minimum of two values, wherein the first value is the additional reference sample value, and the second value is the lower limit.

In FIG. 15, the closest reference sample is a nearest reference sample located to the left of the predicted sample when intra prediction is horizontal. When intra prediction is vertical, the closest reference sample is a nearest reference sample located above the predicted sample. From this figure it could be seen that the comparison result is used to switch both:

results of thresholding functions, i.e. minimum and maximum, and one of the arguments of the thresholding function.

Figure 16:
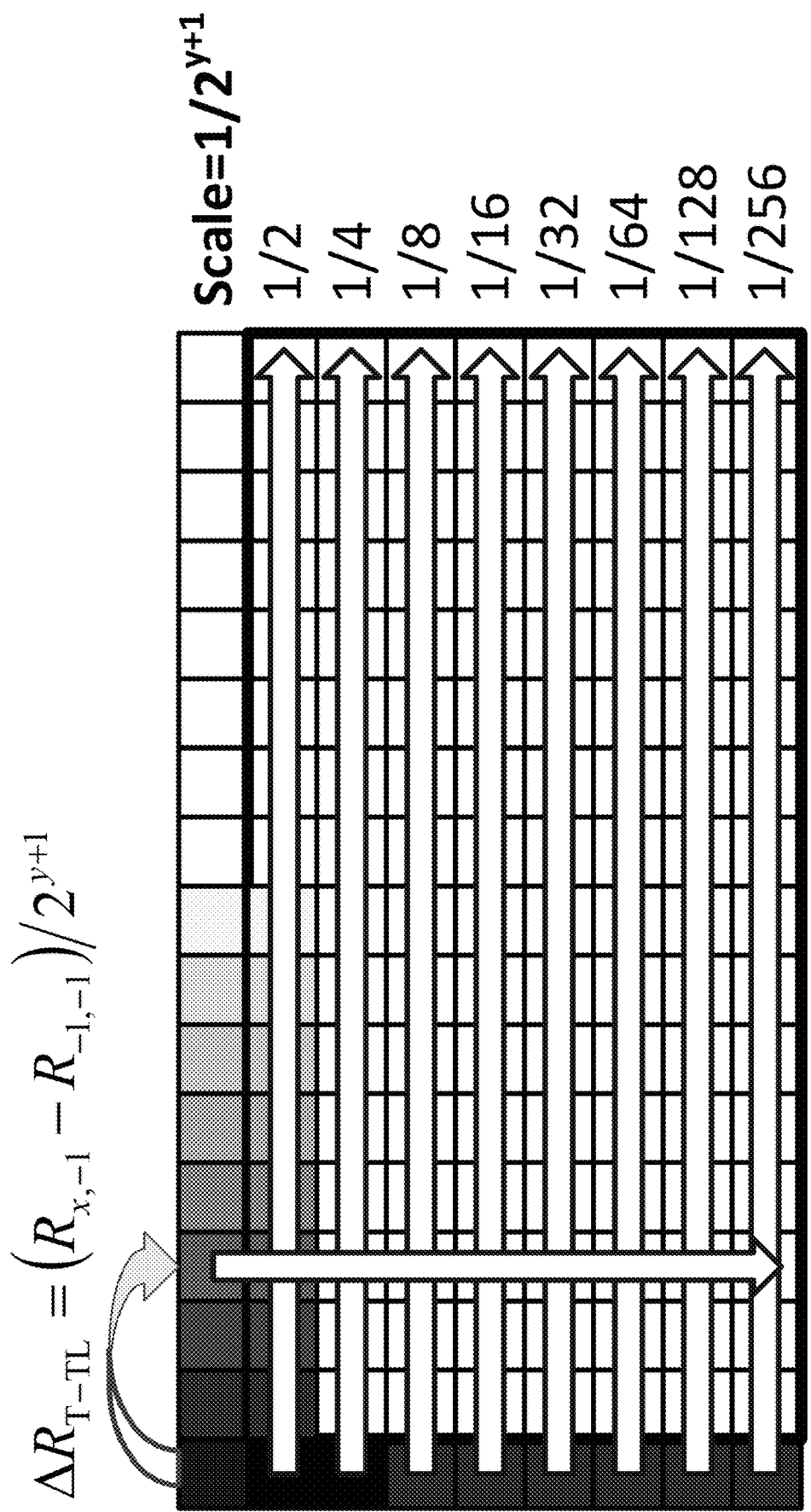
FIG. 16 illustrates another example of intra-predicting a block of samples.

It is noteworthy that Clip3( ) function provides two thresholding operations. One threshold is the minimum value of the predicted sample and the other one is the maximum value of the predicted sample. In comparison with Clip3( ) function applied to the updated predicted sample (FIG. 16), the proposed thresholding (FIG. 15) applies to only one threshold: either the minimum value of the predicted sample or the maximum value of the predicted sample.

It could also be noticed that the above-described thresholding reposition enables usage of the same equation without clipping for all of the intra predicted modes, where PDPC is applicable.

It is worth noting that PDPC actually performs boundary smoothing that can adversely affect the compression performance in the case of applying PDPC to content containing sharp edges (for example, screen content).

This disadvantage can be overcome by PDPC by adding a mechanism that prevents blurring sharp edges. In the case of horizontal and vertical directional intra prediction modes, PDPC uses the boundary smoothing described above and presented in FIG. 16 for horizontal mode. To perform boundary smoothing, the difference $\Delta R_{T-TL}$ between a top-left reference sample $R_{-1,-1}$ and a top reference sample $R_{x,-1}$ placed in a top row of reference samples at position x is computed as follows:

$$\Delta R_{T-TL}=(R_{x,-1}-R_{-1,-1})/2^{y+1}.$$

This difference $\Delta R_{T-TL}$ is added to a sample located at position (x, y) within a block to be predicted using horizontal mode.

Similarly, boundary smoothing is performed for vertical intra prediction mode but the difference $\Delta R_{L-TL}$ between a top-left reference sample $R_{-1,-1}$ and a left reference sample $R_{-1,y}$ placed in a left column of reference samples at position y is calculated as follows:

$$\Delta R_{L-TL}=(R_{-1,y}-R_{-1,-1})/2^{x+1}.$$

This difference $\Delta R_{L-TL}$ is added to a sample located at position (x, y) within a block to be predicted using vertical mode.

To avoid blurring sharp boundaries using this boundary smoothing, similarity between reference samples of a top reference sample row should be measured, similarity between reference samples of a left reference sample column should be measured. If reference samples in the left column have similar parameters (e.g., intensity for one or each color component such as luma and chroma, distribution of these intensities, etc.) with reference samples in the top row, boundary smoothing is performed. Otherwise, boundary smoothing is skipped (so called, hard thresholding) or applied to samples within a block to be predicted but with reduced weight (so called, soft thresholding) that can be defined, for example, by the denominators $2^w$ where w=y+1 and w=x+1 in the above formulas.

In the case of hard thresholding, a similarity measure is calculated between reference samples of a top reference sample row, a similarity measure is calculated between reference samples of a left reference sample column. As this measure, $\Delta R_L(y)=abs(R_{-1,y}-R_{-1,y-1})$, a similarity measure is calculated between reference samples of a left reference sample column. As this measure, $\Delta R_T(x)=abs(R_{x,-1}-R_{x-1,-1})$, a similarity measure is calculated between reference samples of a top reference sample row, where abs (•) is a function that returns the absolute value of a given number, can be used for a $1^{st}$ row or $1^{st}$ column of a block to be predicted in the case of horizontal and vertical modes, respectively. If the inequalities $\Delta R_T > \Delta R_{THR}$ and $\Delta R_L > \Delta R_{THR}$ are fulfilled, boundary smoothing is not performed. Otherwise, it is performed with any modifications of boundary smoothing procedure (i.e. some parameters adjustments are possible).

In the case of soft thresholding, the same measures (e.g., $\Delta R_L(y) = \text{abs}(R_{-1,y} - R_{-1,y-1})$) can be used to estimate similarity between reference samples of a left reference sample column, the same measures (e.g., $\Delta R_T(x) = \text{abs}(R_{x,-1} - R_{x-1,-1})$) can be used to estimate similarity between reference samples of a top reference sample row. Then, $\Delta R_{T-TL}$ for horizontal mode and $\Delta R_{L-TL}$ for vertical mode are calculated as follows:

$$\Delta R_{T-TL} = (R_{x,-1} - R_{-1,-1})/2^{y + f_W(\Delta R_L)},$$

$$\Delta R_{L-TL} = (R_{-1,y} - R_{-1,-1})/2^{x + f_W(\Delta R_T)},$$

where $f_w(\cdot)$ is defined for input values in the range of $[0, 2^n - 1]$, where n is the bit depth of samples in a still picture or a video sequence. Output values of the function $f_w(\cdot)$ falls into $[0, n]$. The function $f_w(\cdot)$ can be defined either analytically or as a look-up table (LUT). The following formula exemplifies $f_w(\cdot)$:

$$f_W(\delta) = \log_2(\delta >> q),$$

where q is the value that defines the range of input values (in this particular case, this range is $[0, 1<<q]$), where $f_w(\delta) = 0$.

Table 7 exemplifies a tabulated $f_w(\cdot)$:

In Table 7, an exemplary lookup table (LUT) to represent the function $f_w(\cdot)$ for n=10:

| A range of input values | Output value |
| --- | --- |
| 0-3 | 0 |
| 4-169 | 1 |
| 170-203 | 6 |
| 204 and higher | 7 |

Figure 17:
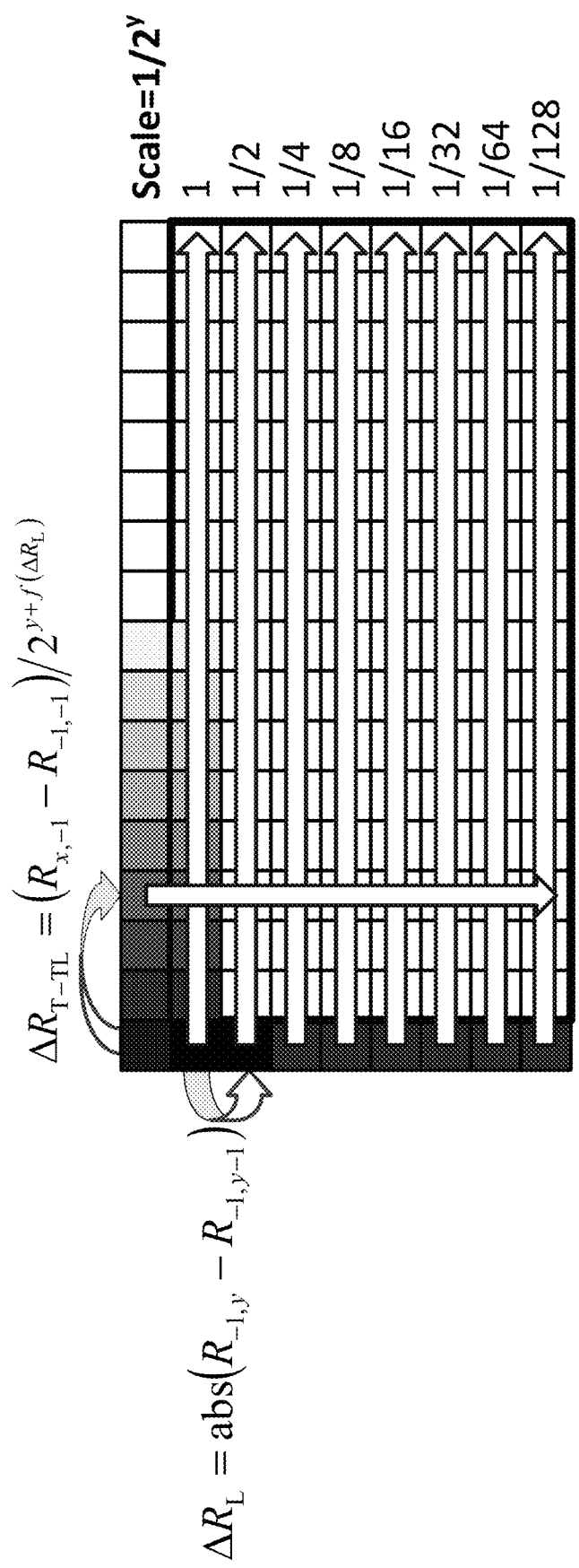
FIG. 17 illustrates another example of intra-predicting a block of samples.
Figure 18:
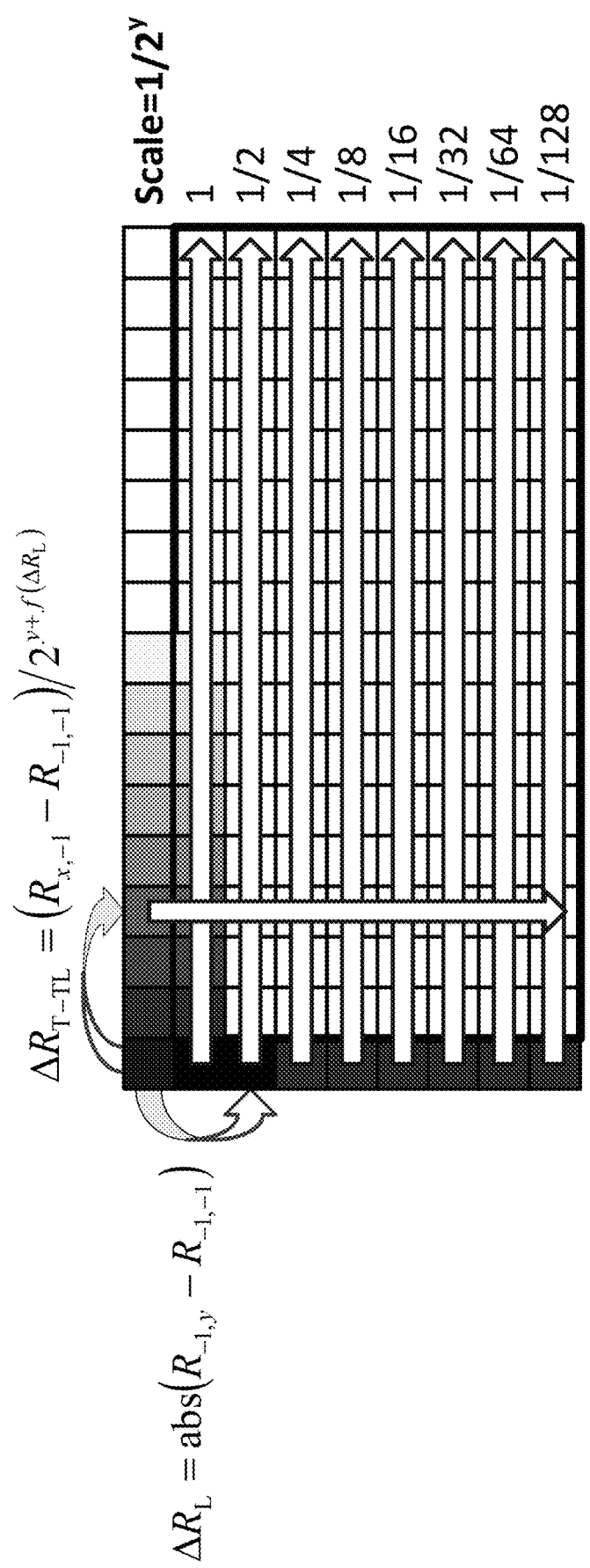
FIG. 18 illustrates another example of intra-predicting a block of samples.

Another function that can be used is defined by the following formulas:

$$f_W(\delta) = \max(f_W^{TAB}(\Delta R_L(0)), f_W^{TAB}(\delta)),$$

$$f_W(\delta) = \max(f_W^{TAB}(\Delta R_T(0)), f_W^{TAB}(\delta)),$$

for horizontal and vertical modes, respectively. This embodiment, when $\Delta R_L(y) = \text{abs}(R_{-1,y} - R_{-1,y-1})$ and abs$(R_{x,-1} - R_{x-1,-1})$, is shown in FIG. 17. Values of $\Delta R_L(y)$ and $\Delta R_T(x)$ can be redefined as follows:

$$\Delta R_L(y) = \text{abs}(R_{-1,y} - R_{-1,-1}),$$

$$\Delta R_T(x) = \text{abs}(R_{x,-1} - R_{-1,-1}),$$

for horizontal and vertical modes, respectively. This embodiment is shown in FIG. 18.

Further embodiments provided herein include the following embodiments listed below:

1. A method of intra predicting a block of a picture, comprising for each sample from a plurality of samples of the block:
   obtaining a predicted sample value from one or more reference sample values by intra-prediction using horizontal or vertical intra prediction mode;
   multiplying the predicted sample value by a sample weighting factor, resulting in a weighted predicted sample value;
   determining a weight value based on a scaling factor for a direction that is spatially orthogonal to the direction of the intra prediction mode, in accordance with the similarity between reference samples located on a top reference sample row and the similarity between reference samples located on a left reference sample column
   calculating an additional value as an additional reference sample value multiplied by the obtained weight value;
   adding the additional value to the weighted predicted sample value, resulting in a non-normalized predicted sample value; and
   normalizing the non-normalized predicted sample value, resulting in a normalized predicted sample value.
2. The method of embodiment 1, wherein
   when the intra prediction mode is vertical, the additional reference sample value is set equal to the difference between the value of the nearest reference sample located above the predicted sample and the top-left reference sample;
   when the intra prediction mode is horizontal, the additional reference sample value is set equal to the difference between the value of the nearest reference sample located to the left of the predicted sample and the top-left reference sample.
3. The method of any one of embodiments 1-2, wherein a similarity measure is calculated per a block of predicted samples.
4. The method of any one of embodiments 1-2, wherein a similarity measure is calculated per a set of samples, the set comprises a row of predicted samples for horizontal prediction mode and a column of predicted samples for vertical intra prediction mode.
5. The method of any one of embodiments 1-4, wherein
   when the similarity measure value between reference samples located on a top reference sample row is greater than a predetermined threshold and the similarity measure value between reference samples located on a left reference sample column is greater than a predetermined threshold, determining an additional value as an additional reference sample value.
6. The method of any one of embodiments 1-5, wherein the weight value is right-shifted when the similarity measure value being greater than the predetermined threshold.
7. The method of any one of embodiments 1-5, wherein the step of determining a weight value based on a scaling factor for a direction that is spatially orthogonal to the direction of the intra prediction mode, in accordance with the similarity between reference samples located on a top reference sample row and a left reference sample column, comprises:
   when the similarity between reference samples located on a top reference sample row is not greater than a predetermined threshold and/or the similarity between reference samples located on a left reference sample column is not greater than a predetermined threshold, determining the weight value based on the scaling factor for the direction that is spatially orthogonal to the direction of the intra prediction mode.
8. The method of any one of embodiments 5-7, wherein the value of the predetermined threshold is fetched from the lookup table.
9. The method of any one of the embodiments 1-8, wherein similarity measure is an absolute difference of two adjacent reference samples.
10. The method of any one of embodiments 1 to 8, wherein similarity measure is an absolute difference between the nearest reference sample located above the predicted sample and the top-left reference sample, or similarity measure is an absolute difference between the nearest reference sample located to the left of the predicted sample and the top-left reference sample.

11. The method of any one of the embodiments 1-10, wherein the normalizing the non-normalized predicted sample value, resulting in a normalized predicted sample value, comprises:
normalizing the non-normalized predicted sample value by an arithmetic right shift of an integer representation of the non-normalized predicted sample value, resulting in a normalized predicted sample value.

12. The method of any one of embodiments 1 to 11, wherein the sample weighting factor is defined to be equal to a difference between two values,
the first value is equal to 1<<S, where S is a shift value used for normalization; and
the second value equal to a sum of weights applied to additional reference sample values to obtain additional values.

13. The method of any one of embodiments 1 to 11, wherein the sample weighting factor is defined to be equal to 1<<S, where S is a shift value used for normalization.

14. A method of intra predicting a block of a picture, comprising: for each sample from a plurality of samples of the block:
obtaining a predicted sample value from one or more reference sample values by intra-prediction using horizontal or vertical intra prediction mode;
multiplying the predicted sample value by a sample weighting factor, resulting in a weighted predicted sample value;
determining whether a similarity between reference samples located on a top reference sample row and/or a similarity between reference samples located on a left reference sample column is greater than a predetermined threshold;
when both the similarity measure values are greater than a predetermined threshold, adding an additional value being an additional reference sample value to the weighted predicted sample value, resulting in a non-normalized predicted sample value;
when any one of the similarity measure values is not greater than a predetermined threshold, determining a weight value based on a scaling factor for a direction that is spatially orthogonal to the direction of the intra prediction mode; calculating an additional value as an additional reference sample value multiplied by the obtained weight value; adding the additional value to the weighted predicted sample value, resulting in a non-normalized predicted sample value; and
normalizing the non-normalized predicted sample value, resulting in a normalized predicted sample value.

15. The method of embodiment 14, wherein
when the intra prediction mode is vertical, the additional reference sample value is set equal to the difference between the value of the nearest reference sample located above the predicted sample and the top-left reference sample;
when the intra prediction mode is horizontal, the additional reference sample value is set equal to the difference between the value of the nearest reference sample located to the left of the predicted sample and the top-left reference sample.

16. The method of embodiment 14 or 15, wherein a similarity measure is calculated per a block of predicted samples.

17. The method of embodiment 14 or 15, wherein a similarity measure is calculated per a set of samples, the set comprises a row of predicted samples for horizontal prediction mode and a column for vertical intra prediction mode.

18. The method of any one of embodiments 14 to 17, wherein similarity measure is an absolute difference of two adjacent reference samples.

19. The method of any one of embodiments 14 to 17, wherein similarity measure is an absolute difference between the nearest reference sample located above the predicted sample and the top-left reference sample, or similarity measure is an absolute difference between the nearest reference sample located to the left of the predicted sample and the top-left reference sample.

20. The method of any one of the embodiments 1-19, wherein the value of the predetermined threshold is fetched from a lookup table.

21. The method of any one of embodiments 14 to 20, wherein the sample weighting factor is defined to be equal to a difference between two values,
the first value is equal to 1<<S, where S is a shift value used for normalization; and
the second value equal to a sum of weights applied to additional reference sample values to obtain additional values.

22. The method of any one of embodiments 14 to 20, wherein the sample weighting factor is defined to be equal to 1<<S, where S is a shift value used for normalization.

23. An encoder for encoding a picture comprising processing circuitry for carrying out the method according to any one of embodiments 1 to 22.

24. A decoder for decoding a picture comprising processing circuitry for carrying out the method according to any one of embodiments 1 to 22.

25. A decoder, comprises:
one or more processors; and
a non-transitory computer-readable storage medium coupled to the processors and storing programming for execution by the processors, wherein the programming, when executed by the processors, configures the decoder to carry out the method according to any one of embodiments 1 to 22.

26. An encoder, comprising:
one or more processors; and
a non-transitory computer-readable storage medium coupled to the processors and storing programming for execution by the processors, wherein the programming, when executed by the processors, configures the encoder to carry out the method according to any one of embodiments 1 to 22.

27. A non-transitory computer-readable medium carrying a program code which, when executed by a computer device, causes the computer device to perform the method of any one of embodiments 1 to 22.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (e.g., an encoder) and 344 (e.g., a decoder) may not be available in case the picture processing coding is limited to a single picture 17. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

The invention claimed is:
1. An intra prediction method, comprising:
   determining a prediction value for a sample of a current block from one or more reference samples outside the current block using an intra predication mode;
   when one or more predefined conditions are not satisfied, deriving a weighted prediction value and coding the current block using the weighted prediction value, wherein the one or more predefined conditions relate to at least one of a width and/or a height of the current block and the intra prediction mode; and
   wherein the one or more predefined conditions comprise at least one of the following conditions:
   a) a sum of the width and the height of the current block is smaller than a first threshold and/or the sum of the width and the height of the current block is larger than a second threshold,
   b) the sum of the width and the height of the current block is smaller than a first threshold or the sum of the width and the height or the current block is larger than a second threshold; and the intra prediction mode is a planar mode or one of a plurality of skew non-diagonal modes satisfying ((predMode>=VDIA_IDX−numModes && predMode !=VDIA_IDX)|| (predMode !=2 && predMode <=(2+numModes))), wherein VDIA_IDX is an index of the diagonal modes, numModes is a predefined integer and predMode is an index of the intra prediction mode,
   c) the sum of the width and the height of the current block is smaller than a first threshold; the sum of the width and the height of the current block is larger than a second threshold; and the intra prediction mode is a planar mode or one of the skew non-diagonal modes satisfying: ((predMode>=VDIA_IDX−numModes && predMode !=VDIA_IDX) ||(predMode !=2 && predMode<=(2+numModes))),
   d) the sum of the width and the height of the current block is smaller han a first threshold; the sum of the width and the height of the current block is larger than a second threshold; and the intra prediction mode is a planar mode; and
   e) the sum of the width and the height of the current block is smaller than a first threshold; the sum of the width and the height of the current block is larger than a second threshold, and the intra prediction mode is one of the skew non-diagonal modes satisfying ((predMode>=VDIA_IDX−numModes && predMode !=VDIA_IDX) ||(predMode !=2 && predMode<=(2+numModes))); or when the current block is a chroma block, the one or more predefined conditions comprise at least one of the following conditions:
  a) a sum of the width and the height of the current block is smaller than a first threshold or the sum of the width and the height of the current block is larger than a second threshold,
  b) the sum of the width and the height of the current block is smaller than a first threshold, and the intra prediction mode is a cross-component linear modeling mode,
  c) the sum of the width and the height of the current block is smaller than a first threshold and the intra prediction mode is a cross-component linear modeling mode; and the sum of the width and the height of the current block is larger than a second threshold,
  d) the sum of the width and the height of the current block is smaller than a first threshold; and the intra prediction mode is a planar mode,
  e) the sum of the width and the height of the current block is smaller than a first threshold; and the intra prediction mode is one of a plurality of skew non-diagonal modes satisfying ((predMode>=VDIA_IDX−numModes && predMode !=VDIA_IDX) ||(predMode !=2 && predMode<=(2+numModes))),
  f) the sum of the width and the height of the current block is smaller than a first threshold; and the intra prediction mode is a cross-component linear modeling mode or a planar mode,
  g) the sum of the width and the height of the current block is smaller than a first threshold; and the intra prediction mode is a cross-component linear modeling mode or one of the skew non-diagonal modes satisfying: ((predMode>=VDIA_IDX−numModes && predMode !=VDIA_IDX) ||(predMode !=2 && predMode<=(2+numModes))),
  h) the sum of the width and the height of the current block is smaller than a first threshold or the sum of the width and the height of the current block is larger than a second threshold, and the intra prediction mode is a cross-component linear modeling mode, a planar mode, or one of the skew non-diagonal modes: ((predMode>=VDIA_IDX−numModes && predMode !=VDIA_IDX) ||(predMode !=2 && predMode<=(2+numModes))); and
  i) the sum of the width and the height of the current block is smaller than a first threshold; the intra prediction mode is a cross-component linear modeling mode, a planar mode, or one of the skew non-diagonal modes satisfying ((predMode>=VDIA_IDX−numModes && predMode !=VDIA_IDX) ||(predMode !=2 && predMode<=(2+numModes))); the sum of the width and the height of the current block is larger than a second threshold; and the intra prediction mode is a planar mode or one of the skew non-diagonal modes satisfying: ((predMode>=VDIA_IDX−numModes && predMode !=VDIA_IDX) ||(predMode !=2 && predMode<=(2+numModes))).

2. The method of claim 1, wherein the current block is comprised in a current frame of a video sequence or a still image.

3. The method of claim 1, further comprising:
when the one or more predefined conditions are satisfied, coding the current block using the prediction value.

4. The method of claim 1, wherein the weighted prediction value is derived based on:
  a) the prediction value at a position (x, y) of the sample in the current block, where x is a horizontal coordinate of the sample and y is a vertical coordinate of the sample,
  b) the width and/or the height of the current block,
  c) a value of a top reference sample of the current block located adjacent to the current block in a row atop of the current block at an x-th column of the current block and a value of a left reference sample of the current block located adjacent to the current block in a column on a left-hand side of the current block at a y-th row of the current block, and
  d) the intra prediction mode.

5. The method of claim 4, wherein the weighted prediction value is derived according to a formula that comprises:

$$\hat{P}(x,y) = \text{Clip1Cmp}((wL \times R_{-1,y} + wT \times R_{x,-1} - wTL \times R_{-1,-1} + (64 - wL - wT + wTL) \times P(x,y) + 32)) >> 6) \text{ wherein}$$

$\hat{P}(x, y)$ is the weighted prediction value of the sample;
P(x, y) is the prediction value of the sample;
$R_{x,-1}$, $R_{-1,y}$ respectively represent values of the top and the left reference samples of the current block;
$R_{-1,-1}$ represents the value of a reference sample of the current block located adjacent to the current block at a top-left corner of the current block;
wL, wT and wTL represent weights;
wherein function Clip1Cmp is set equal to a clipping function Clip1Y, when the current block is a luma block, and is set equal to a clipping function Clip1C, when the current block is a chroma block, wherein $$Clip1Y(x) = Clip3(0, (1 << BitDepth_Y) - 1, x)$$

$$Clip1C(x) = Clip3(0, (1 << BitDepth_C) - 1, x)$$

$$Clip3(x, y, z) = \begin{cases} x; & z < x \\ y; & z > y \\ z; & \text{otherwise} \end{cases}$$

and where $BitDepth_Y$ is a bit depth of luma samples and $BitDepth_C$ is a bit depth of chroma samples.

6. The method of claim 5, wherein the weights are derived by:

$$wL = V >> ((x << 1) >> n\text{Scale}X);$$

$$wT = V >> ((y << 1) >> n\text{Scale}Y);$$

where V, nScaleX, nScaleY are predetermined values; and
  wTL=−(wL>>4)−(wT>>4), when the intra prediction mode is a DC mode,
wTL=0, when the intra prediction mode is a planar mode,
wTL=wT, when the intra prediction mode is a horizontal mode, and
wTL=wL, when the intra prediction mode is a vertical mode.

7. The method of claim 6, wherein V is 16 or 32.

8. The method of claim 6, wherein:

$$N\text{Scale}X = N\text{Scale}Y = (\log_2(w) + \log_2(h) + 2) >> 2,$$

where w and h are a width and a height in units of samples, respectively, of the current block.

9. A decoder apparatus, comprising:
one or more processors; and
a non-transitory computer-readable storage medium coupled with the one or more processors and storing programming for execution by the one or more processors, wherein the programming, when executed by the one or more processors, configures the apparatus to perform operations comprising:
  determining a prediction value for a sample of a current block from one or more reference samples outside the current block using an intra predication mode;
  when one or more predefined conditions are not satisfied, deriving a weighted prediction value, and coding the current block using the weighted prediction value, wherein the one or more predefined conditions relate to at least one of a width and/or a height of the current block and the intra prediction mode, and
  wherein the one or more predefined conditions comprise at least one of the following conditions:
  a) a sum of the width and the height of the current block is smaller than a first threshold and/or the sum of the width and the height of the current clock is larger than a second threshold,
  b) the sum of the width and the height of the current block is smaller than a first threshold or the sum of the width and the height or the current block is larger than a second threshold; and the intra prediction mode is a planar mode or one of a plurality of skew non-diagonal modes satisfying ((predMode>=VDIA_IDX−numModes && predMode !=VDIA_IDX)||(predMode !=2 && predMode <=(2+numModes))),
    wherein VDIA_IDX is an index of the diagonal modes, numModes is a predefined integer and predMode is an index of the intra prediction mode,
  c) the sum of the width and the height of the current block is smaller than a first threshold, the sum of the width and the height of the current block is larger than a second threshold; and the intra prediction mode is a planar mode or one of the skew non-diagonal modes satisfying: ((predMode>=VDIA_IDX−numModes && predMode !=VDIA_IDX) ||(predMode !=2 && predMode<=(230 numModes))),
  d) the sum of the width and the height of the current block is smaller than a first threshold; the sum of the width and the height of the current block is larger than a second threshold, and the intra prediction mode is a planar mode, and
  e) the sum of the width and the height of the current block is smaller than a first threshold, the sum of the width and the height of the current block is larger than a second threshold; and the intra prediction mode is one of the skew non-diagonal modes satisfying ((predMode>=VDIA_IDX−numModes && predMode!=VDIA_IDX) ||(predMode !=2 && predMode<=(230 numModes))), or
  wherein the current block is a chroma block, the one or more predefined conditions comprise at least one of the following conditions:
  a) a sum of the width and the height of the current block is smaller than a first threshold or the sum of the width and the height of the current block is larger than a second threshold,
  b) the sum of the width and the height of the current block is smaller than a first threshold, and the intra prediction mode is a cross-component linear modeling mode,
  c) the sum of the width and the height of the current block is smaller than a first threshold and the intra prediction mode is a cross-component linear modeling mode; and the sum of the width and the height of the current block is larger than a second threshold,
  d) the sum of the width and the height of the current block is smaller than a first threshold; and the intra prediction mode is a planar mode,
  e) the sum of the width and the height of the current block is smaller than a first threshold; and the intra prediction mode is one of a plurality of skew non-diagonal modes satisfying ((predMode>=VDIA_IDX−numModes && predMode !=VDIA_IDX) ||(predMode !=2 && predMode<=(2+numModes))),
  f) the sum of the width and the height of the current block is smaller than a first threshold; and the intra prediction mode is a cross-component linear modeling mode or a planar mode,
  g) the sum of the width and the height of the current block is smaller than a first threshold; and the intra prediction mode is a cross-component linear modeling mode or one of the skew non-diagonal modes satisfying: ((predMode>=VDIA_IDX−numModes && predMode !=VDIA_IDX) ||(predMode !=2 && predMode<=(2+numModes))), p2 h) the sum of the width and the height of the current block is smaller than a first threshold or the sum of the width and the height of the current block is larger than a second threshold; and the intra prediction mode is a cross-component linear modeling mode, a planar mode, or one of the skew non-diagonal modes: ((predMode>=VDIA_IDX−numModes && predMode !=VDIA_IDX) ||(predMode !=2 && predMode<=(2+numModes))); and
  i) the sum of the width and the height of the current block is smaller than a first threshold; the intra prediction mode is a cross-component linear modeling mode, a planar mode, or one of the skew non-diagonal modes satisfying ((predMode>=VDIA_IDX−numModes && predMode !=VDIA_IDX) ||(predMode !=2 && predMode<=(230 numModes))); the sum of the width and the height of the current block is larger than a second threshold; and the intra prediction mode is a planar mode or one of the skew non-diagonal modes satisfying: ((predMode>=VDIA_IDX−numModes && predMode !=VDIA_IDX)||(predMode !=2 && predMode<=(2+numModes))).

10. The apparatus of claim 9, wherein the current block is comprised in a current frame of a video sequence or a still image.

11. The apparatus of claim 9, wherein the programming, when executed by the one or more processors, further configures the apparatus to perform operations comprising:
  when the one or more predefined conditions are satisfied, coding the current block using the prediction value.

12. The apparatus of claim 9, wherein the weighted prediction value is derived based on:
  a) the prediction value at a position (x, y) of the sample in the current block, where x is a horizontal coordinate of the sample and y is a vertical coordinate of the sample,
  b) the width and/or the height of the current block,
  c) a value of a top reference sample of the current block located adjacent to the current block in a row atop of the current block at an x-th column of the current block and a value of a left reference sample of the current block located adjacent to the current block in a column on a left-hand side of the current block at a y-th row of the current block, and
  d) the intra prediction mode.

13. The apparatus of claim 12, wherein the weighted prediction value is derived according to a formula that comprises:

$$\hat{P}(x,y) = \text{Clip1Cmp}((wL \times R_{-1,y} + wT \times R_{x,-1} - wTL \times R_{-1,-1} + (64 - wL - wT + wTL) \times P(x,y) + 32) >> 6) \text{ wherein}$$

$\hat{P}(x, y)$ is the weighted prediction value of the sample;
P(x, y) is the prediction value of the sample;
$R_{x,-1}$, $R_{-1,y}$ respectively represent values of the top and the left reference samples of the current block;
$R_{-1,-1}$ represents the value of a reference sample of the current block located adjacent to the current block at a top-left corner of the current block;
wL, wT and wTL represent weights;
wherein function Clip1Cmp is set equal to a clipping function Clip1Y, when the current block is a luma block, and is set equal to a clipping function Clip1C, when the current block is a chroma block, wherein $$\text{Clip1}Y(x) = \text{Clip3}(0, (1 << \text{BitDepth}_Y pth_Y) - 1, x)$$

$$\text{Clip1}C(x) = \text{Clip3}(0, (1 << \text{BitDepth}_C) - 1, x)$$

$$\text{Clip3}(x, y, z) = \begin{cases} x; & z < x \\ y; & z > y \\ z; & \text{otherwise} \end{cases}$$

and where $\text{BitDepth}_Y$ is a bit depth of luma samples and $\text{BitDepth}_C$ is a bit depth of chroma samples.

14. The apparatus of claim 13, wherein the weights are derived by:

$$wL = V >> ((x << 1) >> n\text{ScaleX});$$

$$wT = V >> ((y << 1) >> n\text{ScaleY});$$

where V, nScaleX, nScaleY are predetermined values; and
wTL=−(wL>>4)−(wT>>4), when the intra prediction mode is a DC mode, wTL=0, when the intra prediction mode is a planar mode,
wTL=wT, when the intra prediction mode is a horizontal mode, and
wTL=wL, when the intra prediction mode is a vertical mode.

15. The apparatus of claim 14, wherein V is 16 or 32.

16. The apparatus of claim 14, wherein:

$$N\text{ScaleX} = N\text{ScaleY} = (\log_2(w) + \log_2(h) + 2) >> 2,$$

where w and h are a width and a height in units of samples, respectively, of the current block.

* * * * *

UNITED STATES PATENT AND TRADEMARK OFFICE
CERTIFICATE OF CORRECTION

PATENT NO. : 11,589,055 B2
APPLICATION NO. : 17/360224
DATED : February 21, 2023
INVENTOR(S) : Alexey Konstantinovich Filippov, Vasily Alexeevich Rufitskiy and Jianle Chen It is certified that error appears in the above-identified patent and that said Letters Patent is hereby corrected as shown below:

In the Claims

In Claim 9, Column 45, Line 45-46, "(predMode !=2 && predMode<=(230 num-Modes)))," should be --(predMode ! = 2 && predMode <= (2 + numModes))),--

In Claim 9, Column 45, Line 59-60, "(predMode !=2 && predMode<=(230 num-Modes)))," should be --(predMode ! = 2 && predMode <= (2 + numModes))),--

In Claim 9, Column 46, Line 33, "predMode<=(2+numModes))), p2" should be --predMode <= (2 + numModes))),--

In Claim 9, Column 46, Line 51-52, "||(predMode !=2 && predMode<=(230 numModes)));" should be --||(predMode != 2 && predMode <= (2 + numModes)));--

Signed and Sealed this
Ninth Day of May, 2023

Katherine Kelly Vidal
*Director of the United States Patent and Trademark Office*